US012570128B2

(12) United States Patent
Morrison et al.

(10) Patent No.: US 12,570,128 B2
(45) Date of Patent: Mar. 10, 2026

(54) METHODS AND SYSTEMS FOR USING MEAN KINETIC TEMPERATURE TO CONTROL A TRANSPORT CLIMATE CONTROL SYSTEM

(71) Applicant: THERMO KING LLC, Minneapolis, MN (US)

(72) Inventors: Quinn Morrison, Minneapolis, MN (US); James E Conde, Plymouth, MN (US); Paul Harrison Coons, Minneapolis, MN (US)

(73) Assignee: THERMO KING LLC, Minneapolis, MN (US)

( * ) Notice: Subject to any disclaimer, the term of this patent is extended or adjusted under 35 U.S.C. 154(b) by 735 days.

(21) Appl. No.: 17/872,806

(22) Filed: Jul. 25, 2022

(65) Prior Publication Data
US 2024/0025235 A1 Jan. 25, 2024

(51) Int. Cl.
*B60H 1/32* (2006.01)

(52) U.S. Cl.
CPC .......... *B60H 1/3205* (2013.01); *B60H 1/3232* (2013.01); *B60H 2001/3255* (2013.01); *B60H 2001/3272* (2013.01)

(58) Field of Classification Search
CPC .... B60H 2001/3272; B60H 2001/3255; B60H 1/3232; B60H 1/3205
See application file for complete search history.

(56) References Cited

U.S. PATENT DOCUMENTS

| | | | |
|---|---|---|---|
| 1,082,349 A | 12/1913 | Likness | |
| 4,432,211 A * | 2/1984 | Oishi | ................. G05D 23/2401 62/155 |
| 7,905,100 B2 | 3/2011 | Thybo et al. | |
| 2003/0089119 A1* | 5/2003 | Pham | ...................... F04C 28/06 62/212 |
| 2007/0227161 A1* | 10/2007 | Boer | ...................... F25D 29/00 62/172 |

(Continued)

FOREIGN PATENT DOCUMENTS

| | | | | |
|---|---|---|---|---|
| CN | 114992943 A * | 9/2022 | .............. | F25D 11/00 |
| EP | 4227603 | 8/2023 | | |

(Continued)

OTHER PUBLICATIONS

Extended European Search Report, issued in the corresponding European Patent application No. 23187679.8, dated Jan. 3, 2024, 9 pages.

(Continued)

*Primary Examiner* — Jianying C Atkisson
*Assistant Examiner* — Meraj A Shaikh
(74) *Attorney, Agent, or Firm* — HSML P.C.

(57) ABSTRACT

Methods and systems for operating a transport climate control system providing climate control within a climate controlled space of a transport unit, the method including setting a mean kinetic temperature setpoint to control a compressor and/or fans in the transport climate control system and determining a mean kinetic temperature in the climate controlled space. The method further includes regulating the mean kinetic temperature in the climate controlled space while optimizing the energy spent by adjusting the cooling and/or heating capacity of the system.

11 Claims, 9 Drawing Sheets

(56)  References Cited

U.S. PATENT DOCUMENTS

| | | | | |
|---|---|---|---|---|
| 2016/0238308 A1 * | 8/2016 | Uchida | ................. | F25D 17/065 |
| 2017/0030628 A1 * | 2/2017 | Sanders | ................ | F25D 21/004 |
| 2020/0191464 A1 * | 6/2020 | Avhale | .................. | F25D 23/028 |
| 2020/0237788 A1 | 7/2020 | Patel | | |
| 2021/0310709 A1 | 10/2021 | Ries et al. | | |
| 2022/0099362 A1 * | 3/2022 | Satou | ................... | F25D 29/003 |

FOREIGN PATENT DOCUMENTS

| | | | | | |
|---|---|---|---|---|---|
| EP | 4227603 B1 | * | 3/2024 | ........... | F25B 49/005 |
| GB | 2563622 | | 12/2018 | | |

OTHER PUBLICATIONS

"Guide to Control and Monitoring of Storage and Transportation Temperature Conditions for Medicinal Products and Active Substances", Health Products Regulatory Authority, Oct. 2, 2020, 20 pages.

Dileep Punalur, "How to calculate Mean Kinetic Temperature (MKT) in Excel Sheet", Vacker, Oct. 14, 2014, 12 pages.

"Mean kinetic temperature", Wikipedia, Apr. 21, 2020, 1 page.

* cited by examiner

500

METHODS AND SYSTEMS FOR USING MEAN KINETIC TEMPERATURE TO CONTROL A TRANSPORT CLIMATE CONTROL SYSTEM

FIELD

This disclosure is directed to systems and methods for controlling temperature using a transport climate control system, and more specifically, using a mean kinetic temperature to control the transport climate control system.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a mass-transit bus, or other similar transport unit). The TRS can maintain environmental condition(s) of the cargo space to maintain cargo (e.g., produce, frozen foods, pharmaceuticals, etc.). Typically, the temperature inside the cargo space is monitored and controlled to maintain the environmental condition(s). In some embodiments, the transport unit can include a HVAC system to control a climate within a passenger space of the vehicle.

Some existing transport units may include a prime mover for generating power for a generator that supplies power to components of the transport climate control system, e.g., the TRS. As transport units are trending towards electrification, the power for the components of the transport climate control system may come from a battery source in which battery capacity may be limited.

SUMMARY

This disclosure is directed to systems and methods for controlling temperature using a transport climate control system, and more specifically, using a mean kinetic temperature to control the transport climate control system.

It will be appreciated that transport climate control systems are trending toward more use of electrification. Typically, effective power management and route planning can be important for electrified systems because battery recharging can require significant downtime and because providing excessive battery capacity can be expensive. A transport climate control system can provide climate control to a climate controlled space of a transport unit. The power consumption of a transport climate control system can be affected by a number of factors including, for example, door openings (to the climate controlled space) and other driver/operator behaviors, controller settings, ambient conditions, cargo condition (e.g., whether a precooled desired setpoint is matched or not (e.g., hot load/cargo)), etc.

While energy consumption is an important factor to consider for effective power management, a balance may be necessary to control the climate of cargo products to meet quality control requirements for customers. For example, in prior transport climate control systems, a temperature setpoint can be used to thermostatically control the temperature in a climate controlled space of a transport unit using the transport climate control system. Due to the variations and fluctuations of the temperature in the climate controlled space, however, thermostatically controlling the temperature does not ensure the stability, safety, and/or quality of some cargo products, e.g., pharmaceuticals or fruit or ensure optimal usage of available energy for powering the transport climate control system. That is, since the stability, safety, and/or quality of some cargo products can be dependent on different levels of thermal excursion experienced during storage and transport, the cumulative thermal stress experienced by the cargo product should be controlled to be below a target level while ensuring enough energy is available to complete the planned routes for the transport unit.

Moreover, drivers, customers, and operators may have limited insight into the effect of these factors on the total energy usage and climate control requirements of the transport climate control system. In other words, drivers, customers, and operators have limited insight into the factors that can affect the performance of a transport climate control system, including the ability to successfully complete a planned route and maintain product quality requirements of the cargo products. This issue can be particularly relevant for electrified transport climate control systems, in which battery capacity may be limited and cannot be easily replenished.

Embodiments discussed herein are directed to methods and systems for operating a transport climate control system providing climate control within a climate controlled space of a transport unit, the method including setting a mean kinetic temperature setpoint to control a compressor and/or fans of the transport climate control system and determining a mean kinetic temperature in the climate controlled space. The method further includes regulating the mean kinetic temperature in the climate controlled space while optimizing the energy spent by increasing or decreasing the cooling and/or heating capacity of the system. Such features can allow the user have more control over the quality/degradation of the cargo product, by allowing the user to specify the product quality/degradation that the user wants or is acceptable to the user.

In one embodiment, a method of operating a transport climate control system used to provide climate control within a climate controlled space of a transport unit is disclosed. The transport climate control system provides climate control to a climate controlled space of a transport unit. The method includes setting a mean kinetic temperature setpoint to control the transport climate control system. The method further includes determining, using a controller, a mean kinetic temperature in the climate controlled space and determining, using the controller, a difference between the mean kinetic temperature setpoint and the mean kinetic temperature in the climate controlled space. The method also includes controlling the transport climate control system based on at least the difference between the mean kinetic temperature setpoint and the mean kinetic temperature in the climate controlled space to regulate the mean kinetic temperature in the climate controlled space.

In an embodiment, the method includes adjusting a system cooling capacity of the transport climate control system to control the mean kinetic temperature to the mean kinetic temperature setpoint. The method can include determining if the difference is greater than or equal to a first threshold value. The method can further include that when the difference is greater than or equal to the first threshold value, a system cooling capacity of the transport climate control system is decreased. Additionally, the method can include that when the difference is not greater than or equal to the first threshold value, the cooling capacity of the transport climate control system is increased to lower the mean kinetic temperature in the climate controlled space.

In another embodiment, the method includes determining whether a temperature recovery triggering event has occurred or is in progress for the transport unit. If the temperature recovery triggering event has occurred, the method further includes predicting the mean kinetic temperature and a temperature as a function of time, t, for recovery to the mean kinetic temperature setpoint in the climate controlled space. The method also includes determining a predictive value of the mean kinetic temperature in the climate controlled space during and at the end of the recovery. Additionally, the method includes during the recovery, adjusting a system cooling capacity of the transport climate control system to control the predicted mean kinetic temperature to the mean kinetic temperature setpoint. The method can further include, when the predictive value of the mean kinetic temperature is greater than the mean kinetic temperature setpoint at any of the time t, a system cooling capacity of the transport climate control system being increased. Furthermore, the method can include that when a difference between the mean kinetic temperature setpoint and the predicted value of the mean kinetic temperature is not greater than or equal to a second threshold value, operational parameters of the transport climate control system are maintained to maintain the system cooling capacity, and when the difference between the mean kinetic temperature setpoint and the predicted value of the mean kinetic temperature is greater than or equal to the second threshold value, the system cooling capacity of the transport climate control system is decreased.

In yet another embodiment, the method includes switching between a continuous running mode and a start/stop cycle mode to control the mean kinetic temperature to the mean kinetic temperature setpoint. The method can include determining whether the difference is greater than or equal to a third threshold value or whether the compressor is running in a start/stop cycle. When the difference is greater than or equal to the third threshold value or the compressor is running in the start/stop cycle, the compressor is run in a start/stop control mode, but when the difference is less than the third threshold value, the compressor is run in a continuous control mode. The method can also include that, if the compressor is running in the start/stop control mode, determining if the difference is less than a fourth threshold value. When the difference is less than the fourth threshold value, a value of the third threshold value is increased, and when the difference is greater than or equal to the fourth threshold value and is not greater than or equal to a fifth threshold value, the value of the third threshold value is decreased.

In another embodiment, the method for operating the compressor in a start/stop control mode includes setting a start temperature for starting the compressor and a stop temperature for stopping the compressor. The method also includes adjusting the start temperature and/or the stop temperature to control the mean kinetic temperature to the mean kinetic temperature setpoint. The method can include determining whether a cycle of the start/stop control mode has been completed. If the cycle of the start/stop control mode has been completed, the method can include determining whether the difference is not greater than or equal a sixth threshold value, in which when the difference is not greater than or equal to the sixth threshold value, the start temperature and the stop temperature for starting and stopping the compressor is increased. When the difference is greater than or equal to the sixth threshold value and not less than or equal to a seventh threshold value, the method can include decreasing the start temperature and the stop temperature for starting and stopping the compressor, and when the difference is greater than or equal to the sixth threshold value and greater than or equal to the seventh threshold value, the method can include increasing the start temperature and the stop temperature for starting and stopping the compressor.

In another embodiment, the method includes setting an upper bound and/or a lower bound of acceptable temperatures. The method further includes controlling the transport climate control system to control the temperature within the set bounds to control the mean kinetic temperature to the mean kinetic temperature setpoint. This method can further include determining if the difference between the mean kinetic temperature setpoint and the mean kinetic temperature is greater than zero or if a temperature in the climate controlled space is less than a lower temperature threshold. When the difference is greater than zero or when the temperature in the climate controlled space is less than the lower temperature threshold, the method can include increasing a system cooling capacity of the transport climate control system, and when the difference is not greater than zero or when the temperature in the climate controlled space is not less than the lower temperature threshold, the method can include determining whether the difference is less than or equal to zero or if the temperature in the climate controlled space is greater than a high temperature threshold. When the difference is less than or equal to zero or when the temperature in the climate controlled space is greater than a high temperature threshold, the method can include maintaining operational parameters of the transport climate control system to maintain the system cooling capacity, and when the difference is not less than or equal to zero or if the temperature in the climate controlled space is not greater than the high temperature threshold, the method can include decreasing the system cooling capacity of the transport climate control system.

In one embodiment, a transport climate control system for use in a transport unit is disclosed. The system includes a transport climate control system including a compressor configured to provide climate control to a climate controlled space of a transport unit. The system also includes a temperature sensor. The system further includes a controller configured to receive the temperature from the temperature sensor. The controller is also configured to receive a mean kinetic temperature setpoint to control the transport climate control system. The controller is further configured to determine a mean kinetic temperature in the climate controlled space based on the temperature from the temperature sensor. Also, the controller is configured to determine a difference between the mean kinetic temperature setpoint and the mean kinetic temperate in the climate controlled space. The controller is further configured to control the transport climate control system based on at least the difference between the mean kinetic temperature setpoint and the mean kinetic temperature in the climate controlled space to regulate the mean kinetic temperature in the climate controlled space.

Other features and aspects will become apparent by consideration of the following detailed description and accompanying drawings.

DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

Figure 1A:
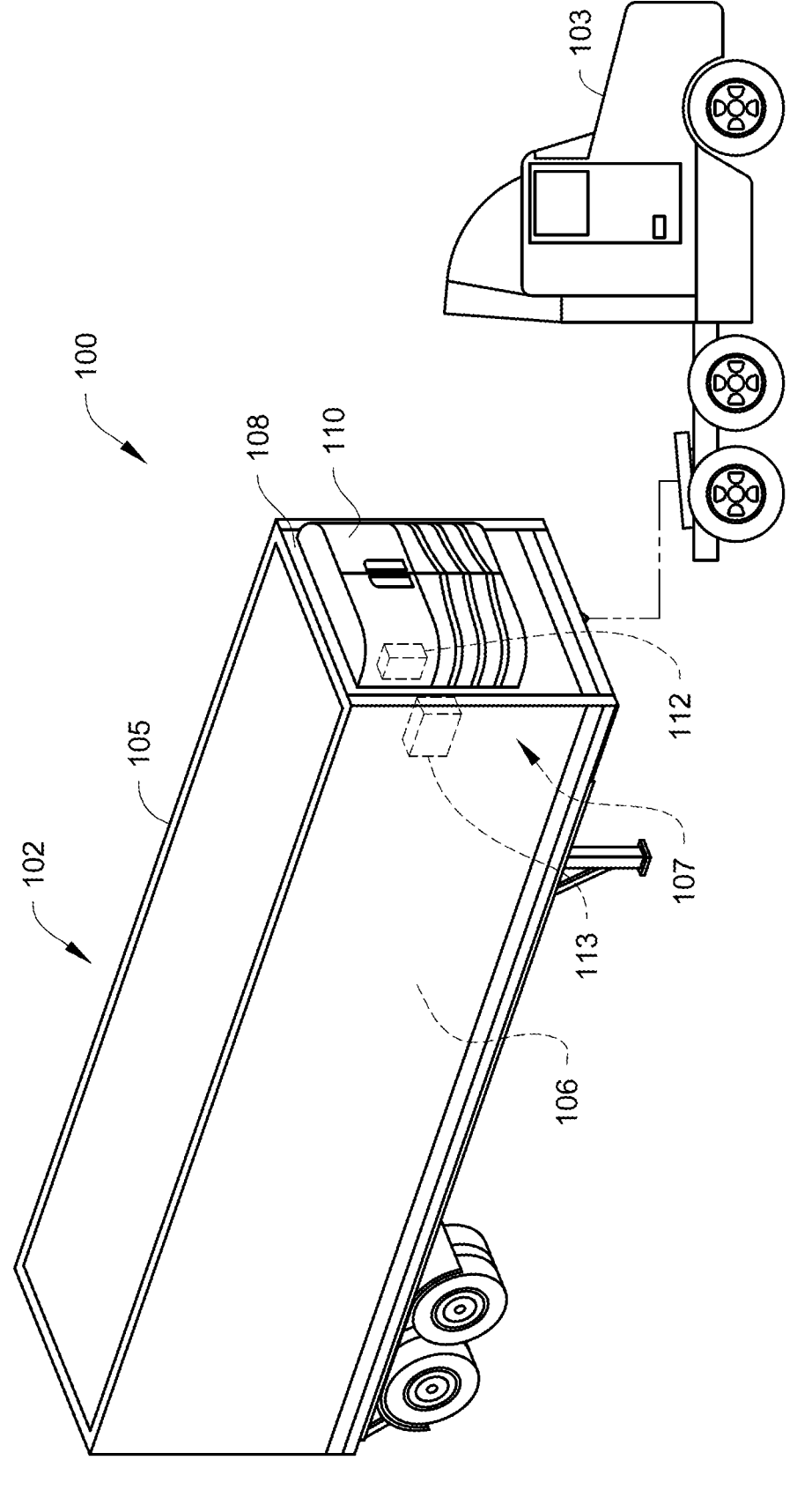
FIG. 1A illustrates a perspective view of a climate controlled transport unit with a transport climate control system attached to a tractor, according to one embodiment.

This disclosure is directed to systems and methods for controlling temperature using a transport climate control system, and more specifically, using a mean kinetic temperature to control the transport climate control system.

While energy consumption is an important factor to consider for effective power management, a balance may be necessary to control the climate of cargo products to meet stability, safety, and/or quality control requirements for customers. For example, in prior transport climate control systems, a temperature setpoint can be used to thermostatically control the temperature in a transport unit using the transport climate control system to prevent the cargo product(s) degradation and maintain the cargo product(s) quality. Due to the variations and fluctuations of the temperature in the climate controlled space and limitations of the hardware, however, thermostatically controlling the temperature does not ensure the stability, safety, and/or quality of some cargo products, e.g., pharmaceuticals or fruit or ensure optimal usage of energy for powering the transport climate control system. That is, since the stability, safety, and/or quality of some cargo products can be dependent on different levels of thermal excursion experienced during storage and transport, the cumulative thermal stress experienced by the cargo product should be controlled to be below a target level while ensuring enough energy is available to complete the planned routes for the transport unit at the lowest cost possible, e.g., providing efficient stability, safety, and/or quality.

Moreover, drivers, customers, and operators may have limited insight into the effect of these factors on the total energy usage and climate requirements of the transport climate control system to maintain product stability, safety, and/or quality. In other words, drivers, customers, and operators have limited insight into the factors that can affect the performance of a transport climate control system, including the ability to successfully complete a planned route and maintain product stability, safety, and/or quality requirements of the cargo products. This issue can be particularly relevant for electrified transport climate control systems, in which battery capacity may be limited and cannot be easily replenished.

As such, the embodiments described herein provide a more intuitive control system for the transport climate control system that can limit high levels of thermal exposure of the cargo product over the course of storage and transport and/or maintains the total effective climate control, e.g., minimize the total thermal stress, to the cargo product at the target level, while optimizing energy usage to ensure a supply energy for powering the transport climate control system for the planned route. As such, by using a mean kinetic temperature, the user is provided a more intuitive control system such that the user can specify the expectations and standards for product degradation and/or quality.

The embodiments described herein are at least directed to a transport climate control system that uses a mean kinetic temperature to control the temperature in the climate controlled space, for example, the temperature of the cargo product(s) or refrigerated space of the transport unit.

The Mean Kinetic Temperature (MKT) is a measure to evaluate the effectiveness of climate control by determining the cumulative thermal stress experienced by products. Specifically, MKT is a way of expressing the overall effect of temperature fluctuations during storage or transit of perishable goods. The MKT can be expressed as EQ. 1 below:

$$T_K = \cfrac{\dfrac{\Delta H}{R}}{-\ln\left(\dfrac{t_1 e\left(\frac{-\Delta H}{RT_1}\right)_{+t_2 e}\left(\frac{-\Delta H}{RT_2}\right)_{+\ldots+t_n e}\left(\frac{-\Delta H}{RT_n}\right)}{t_1 + t_2 + \ldots \, t_n}\right)} \quad \text{(EQ. 1)}$$

Where:

$T_K$ is the mean kinetic temperature in Kelvins;

$\Delta H$ is the activation energy (in kJ mol$^{-1}$);

R is the gas constant (in J mol$^{-1}$K$^{-1}$);

$T_1$ to $T_n$ are the temperatures at each of the sample points in Kelvins; and $t_1$ to $t_n$ are time intervals at each of the sample points.

In many cases, R can be estimated to be the universal gas constant 8.3144×10$^{-3}$ kJ per mol per degree K, while $\Delta H$ can be estimated to be 83.144 kJ per mol which is the activation energy for breaking most covalent bonds. It is appreciated that other activation energies can also be used that are specific for the cargo product (e.g., 59.4 kJ/mol for blueberries, 43 kJ/mol for broccoli, or the like). It is appreciated that the activation energy provided herein are only examples and is not intended to be limiting, but will be dependent on the specific cargo product.

As seen in EQ 1, MKT is a weighted non-linear average that shows the effect of temperature variations over time, in which increased weighting is provided to higher temperature excursions, at least because most products have an accelerated rate of thermal degradation at higher temperatures.

Embodiments disclosed herein provide methods and systems to optimize or balance energy consumption with the MKT for cooling and/or heating by providing the transport climate control system with a more intuitive system to evaluate the effectiveness of climate control on transported cargo products for a transport unit and usage of energy. As such, the methods and systems provided herein maximize the tradeoff between climate control performance and energy use.

FIG. 1A illustrates one embodiment of a transport climate control system for a climate controlled transport unit 102 attached to a tractor 103. The climate controlled transport unit 102 includes a transport climate control system 100 for a transport unit 105. The tractor 103 is attached to and is configured to tow the transport unit 105. The transport unit 105 shown in FIG. 1A is a trailer. It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The transport climate control system 100 includes a transport climate control unit (TCCU) 110 that provides environmental control (e.g. temperature, humidity, air quality, etc.) within a climate controlled space 106 of the transport unit 105. The transport climate control system 100 also includes a programmable climate controller 107 and one or more sensors (not shown) that are configured to measure one or more climate control parameters of the transport climate control system 100 (e.g., an ambient temperature outside of the transport unit 105, a space temperature within the climate controlled space 106, an ambient humidity outside of the transport unit 105, a space humidity within the climate controlled space 106, a door opening event of the transport unit 105, a temperature of the carbo within the climate controlled space 106, etc.) and communicate climate control parameter data to the climate controller 107.

The TCCU 110 is disposed on a front wall 108 of the transport unit 105. In other embodiments, it will be appreciated that the TCCU 110 can be disposed, for example, on a rooftop or another wall of the transport unit 105. The TCCU 110 includes a climate control circuit (see FIG. 2) that connects, for example, a compressor, a condenser, an evaporator and an expansion valve to provide conditioned air within the climate controlled space 106.

The climate controller 107 may comprise a single integrated control unit 112 or may comprise a distributed network of climate controller elements 112, 113. The number of distributed control elements in a given network can depend upon the particular application of the principles described herein. The climate controller 107 is configured to control operation of the transport climate control system 100 including the transport climate control circuit.

Figure 1B:
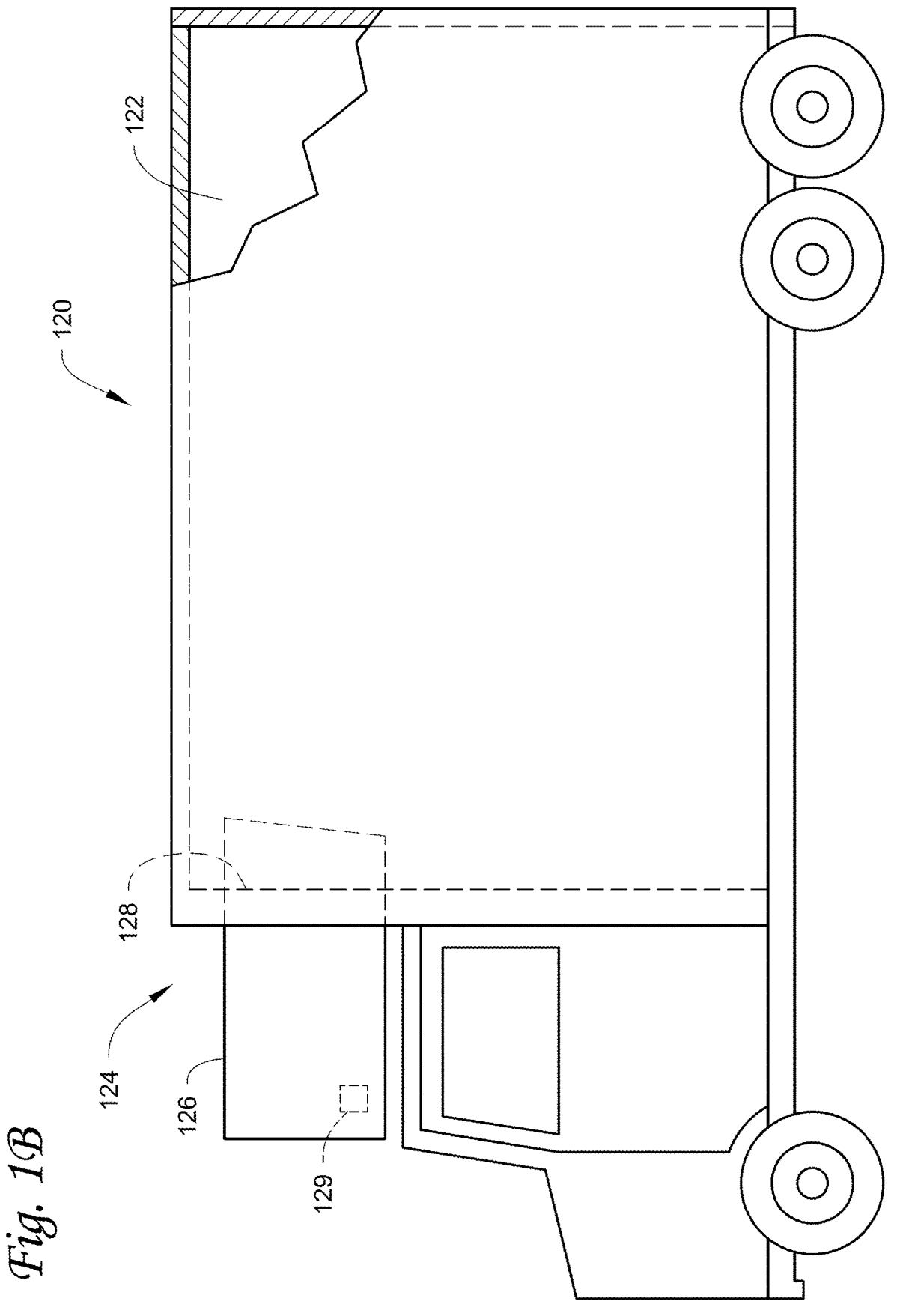
FIG. 1B illustrates a side view of a truck with a transport climate control system, according to one embodiment.

FIG. 1B depicts a temperature-controlled straight truck 120 that includes a climate controlled space 122 for carrying cargo and a transport climate control system 124. The transport climate control system 124 includes a TCCU 126 that is mounted to a front wall 128 of the load space 112. It will be appreciated that the TCCU 126 can be mounted to any other suitable locations. The TCCU 126 is controlled via a climate controller 129 to provide climate control within the climate controlled space 122. The TCCU 126 can include, amongst other components, a climate control circuit (see FIG. 2) that connects, for example, a compressor, a condenser, an evaporator and an expansion valve to provide climate control within the climate controlled space 122.

The transport climate control system 124 also includes a programmable climate controller 129 and one or more sensors (not shown) that are configured to measure one or more climate control parameters of the transport climate control system 124 (e.g., an ambient temperature outside of the truck 120, a space temperature within the climate controlled space 122, an ambient humidity outside of the truck 120, a space humidity within the climate controlled space 122, a door opening event of the truck 120, etc.) and communicate climate control parameter data to the climate controller 129. The climate controller 129 is configured to control operation of the transport climate control system 124 including the transport climate control circuit.

Figure 1C:
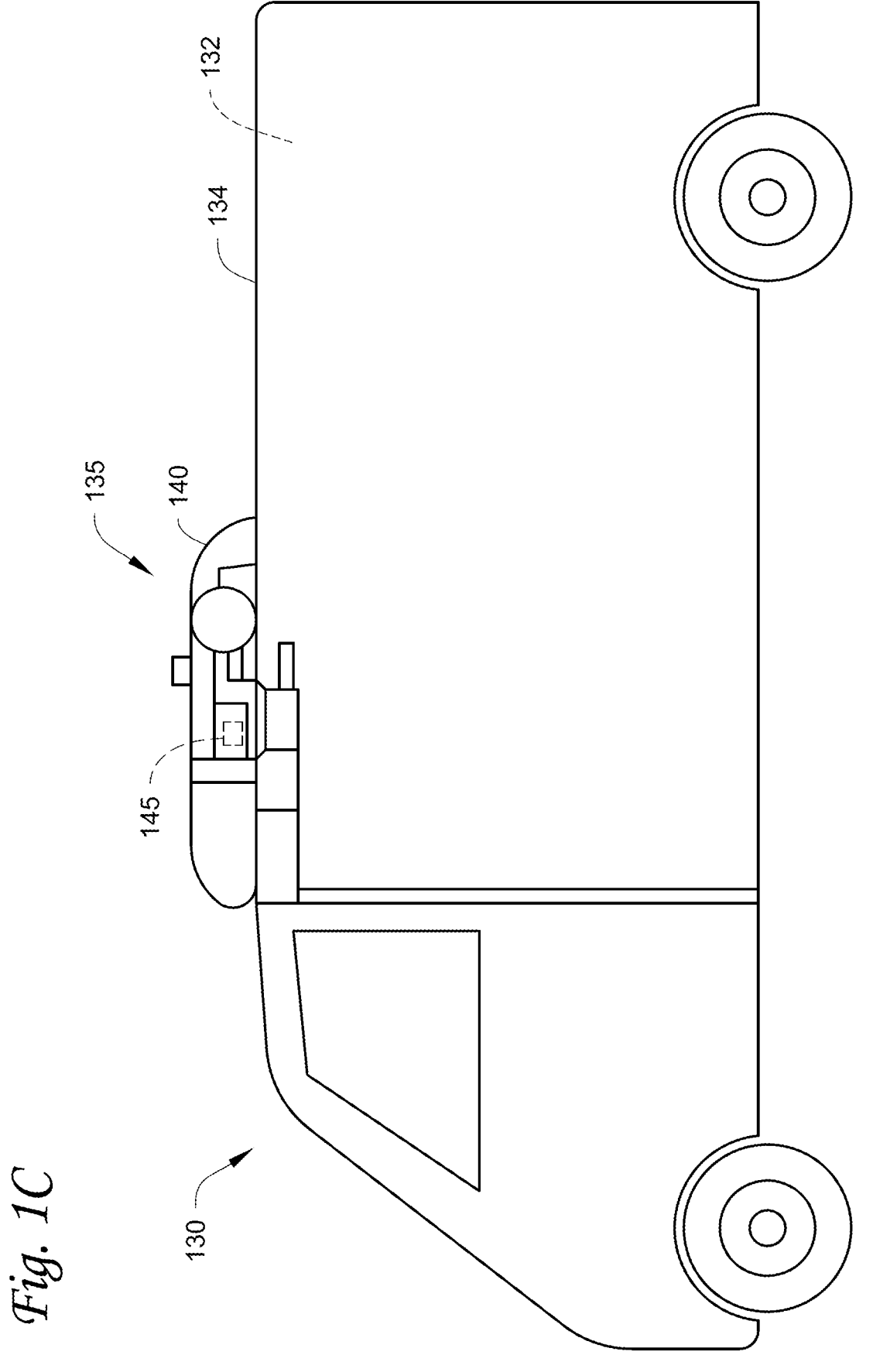
FIG. 1C illustrates a side view of a van with a transport climate control system, according to one embodiment.

FIG. 1C depicts a temperature-controlled van 130 that includes a climate controlled space 132 for carrying cargo and a transport climate control system 135 for providing climate control within the climate controlled space 132. The transport climate control system 135 includes a TCCU 140 that is mounted to a rooftop 134 of the climate controlled space 132. The transport climate control system 135 can include, amongst other components, a climate control circuit (see FIG. 2) that connects, for example, a compressor, a condenser, an evaporator and an expansion valve to provide climate control within the climate controlled space 132.

The transport climate control system 135 also includes a programmable climate controller 145 and one or more sensors (not shown) that are configured to measure one or more climate control parameters of the transport climate control system 135 (e.g., an ambient temperature outside of the van 130, a space temperature within the climate controlled space 132, an ambient humidity outside of the van 130, a space humidity within the climate controlled space 132, a door opening event of the van 130, etc.) and communicate climate control parameter data to the climate controller 145. The climate controller 145 is configured to control operation of the transport climate control system 135 including the transport climate control circuit.

The transport climate control system, in any of the embodiments discussed herein, may include a power system for powering the transport climate control systems as shown in FIGS. 1A-1C. The power system may include one or more prime mover power networks, one or more auxiliary power networks, one or more utility power networks, and one or more transport climate control load networks connected to a power conversion module. The power system can use one or more of the prime mover power network, the auxiliary power network and the utility power network at any given time to provide power to the transport climate control load network. The power system is configured to be a hybrid power system that is powered by the prime mover power network in combination with the auxiliary power network and/or the utility power network, or can be used with a fully electric power system that does not include a prime mover or prime mover power network to provide power to the transport climate control system, e.g., an electrified system.

In an embodiment, the prime mover power network may include a prime mover and an electric machine that can provide electric power to the power conversion module. The prime mover is configured to generate mechanical power and the electric machine is configured to convert the mechanical to electric power. The generated electric power is then sent by the prime mover power network to the power conversion module. In some embodiments, the prime mover can be a vehicle prime mover used to move the vehicle that also provides power to the transport climate control load network when available. In other embodiments, the prime mover and the electric machine can be part of a generator set that provides power to the transport climate control load network.

In some embodiments, the electric machine may be an electrical generator that can provide DC power to the transport climate control load network. In some embodiments, the electric machine can include an alternator and a rectifier or an AC-DC converter (not shown) that rectifies or converts the AC power generated by the electric machine to a DC power.

It is appreciated that when the vehicle is an electric vehicle, there may be no prime mover. The electric machine can be a motor generator that is used with a high voltage (e.g., in a range between 60V and 1500V; for example 400V, 800V, etc.) DC battery to run the vehicle. Electric vehicles can also provide a relatively high voltage (e.g., 400V, 800V, etc.) DC power source (e.g., a battery pack, a rechargeable energy storage system (RESS), etc.). Electric vehicles can include one or more DC-DC converters (e.g., two DC-DC convertors) to convert the relatively high voltage (e.g., 400V, 800V, etc.) to a low voltage (e.g., in a range between 0V and 60V; for example 12V). That is, the electric machine can be replaced with a DC-DC converter having similar parameters as the electric machine in order to be able to provide prime mover network power to the power conversion module.

The auxiliary power network may include an energy storage source and an energy storage management system. In some embodiments, the auxiliary power network can be part of the transport climate control system and potentially housed within a CCU. In other embodiments, the auxiliary power network can be external to the transport climate control system and part of the prime mover power network. In yet some other embodiments, the auxiliary power network can be external to the transport climate control system and external to the prime mover power network.

In some embodiments, the energy storage source can include one or more batteries. For example, in one embodiment the energy storage source can include two batteries (not shown). Each of the batteries can also be connected to the power conversion module. It will be appreciated that the energy storage source can provide sufficient energy to power the transport climate control load network by itself. In some embodiments, the energy storage source can provide 12 VDC or 24 VDC. In other embodiments, the energy storage source can provide 48 VDC.

The power conversion module is configured to convert a power from both of the prime mover power network and the auxiliary power network to a load power compatible with one or more loads of the transport climate control load network. That is, the power conversion module is configured to buck or boost power from the prime mover power network and is configured to buck or boost power from the auxiliary power network to obtain the desired load power. In some embodiments, the power conversion module can include one or more DC/DC converters. For example, the power conversion module can include one DC/DC converter to convert the power generated by the prime mover power network and/or the auxiliary power network to a voltage compatible with one or more loads of the transport climate control load network and a second DC/DC converter to convert the auxiliary network power to a voltage compatible with one or more loads of the transport climate control load network.

The utility power network is configured to charge the energy storage source of the auxiliary power network (or the electric vehicle) when, for example, the vehicle is parked and has access to a utility power source. In some embodiments, the utility power network can also provide power to operate the transport climate control load network when, for example, the vehicle is parked and has access to a utility power source. The utility power network includes the AC-DC converter. The utility power source (e.g., shore power, etc.) can be connected to the AC-DC converter to provide AC power input to the AC-DC converter. The AC-DC converter is configured to convert the AC power from the utility power source and to provide converted DC power to the power conversion module.

Figure 2:
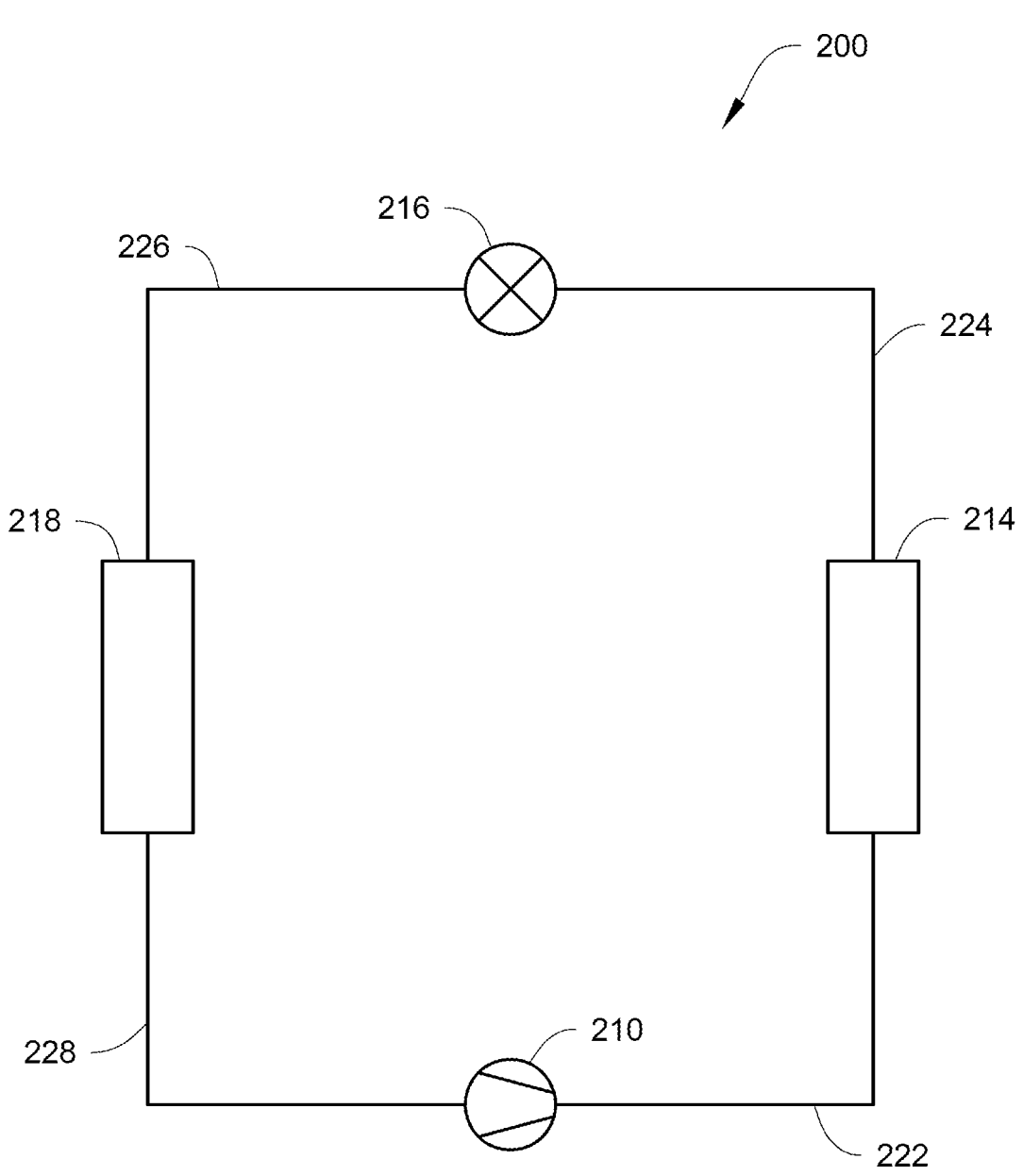
FIG. 2 illustrates a block diagram schematic of a climate control circuit that can be used in a transport climate control system, according to one embodiment.

FIG. 2 illustrates a block diagram of a climate control circuit 200, according to one embodiment that can be used in any of the above transport climate control systems shown in FIGS. 1A-C. The climate control circuit 200 can be, for example, a circuit that can be used to provide climate control within an internal space or cargo space that is a climate controlled space of a transport unit (e.g., the climate controlled space 106, 122, 132, 160 shown in FIGS. 1A-C), etc. A working fluid (e.g., a refrigerant) is configured to pass through components of the climate control circuit 200 via lines 222, 224, 226, and 228 to provide climate control within the internal space or cargo space.

The climate control circuit 200 includes at least a compressor 210, a condenser 214, an expander 216, and an evaporator 218 to provide conditioned air within the climate controlled space.

The compressor 210 is configured to compress a working fluid (e.g., refrigerant) and direct the working fluid through the climate control circuit 200 in order to provide temperature control within a climate controlled space. In particular, the compressor 210 is configured to direct the compressed working fluid that is a gas to the condenser 214. The compressor 210 can be a variable speed compressor or a fixed speed (e.g., two-speed) compressor and can be a digital scroll compressor, a reciprocating compressor, a screw compressor, a positive displacement compressor, a centrifugal compressor, or other suitable type of compressor for compressing a working fluid. The compressor may be controlled in various operational modes, for example, in continuous operation or start/stop operation, as further discussed below.

The condenser 214 can include a condenser coil (not shown) and one or more condenser fans (not shown). The condenser 214 is configured to allow the working fluid, received from the compressor 210, to transform from a gas to a liquid by releasing heat absorbed by the working fluid into the ambient environment outside of the climate controlled space. That is, the condenser 214 is configured to cool and condense the working fluid. The condenser 214 is configured to direct the liquid working fluid to the expander 216.

The expander 216 is configured to receive the working fluid in the form of a liquid from the condenser 214 and is configured to restrict the flow of the working fluid to the evaporator 218. In some embodiments, the expander 216 can be an expansion valve. The expander 216 may be adjustable, for example, having an adjustable orifice diameter or opening. The gaseous working fluid is directed by the expander 216 to the evaporator 218.

The evaporator 218 can include an evaporator coil and evaporator fan(s). The evaporator 218 is configured to allow the working fluid, received from the expander 216, to evaporate from a liquid to a gas by absorbing heat from the climate controlled space and thereby provide cooling to the climate controlled space.

The climate control circuit 200 can be part of a transport climate control system that also includes a programmable climate controller (e.g., the controller 107, 129, 145 shown in FIGS. 1A, 1B, 1C) and one or more sensors (not shown) that are configured to measure one or more climate control parameters of the transport climate control system. The climate controller may include non-volatile memory which includes programming for one, all, or a combination of the operation modes for the climate control circuit, for example, a cooling mode, a recovery mode, a heating mode, a defrost mode, etc. and a processor for executing the programming.

In an embodiment, in the cooling mode, the climate controller is configured to control the system cooling capacity at a set point by continuously controlling one or more components of the climate control system. For example, in an embodiment, the climate controller is configured to instruct the compressor 210 to increase or decrease speed to compress the working fluid until the temperature within the climate controlled space reaches a desired setpoint temperature. In another embodiment, the climate controller may control the speed of a condenser fan to increase and/or decrease the system cooling capacity. It is also appreciated that the system cooling capacity may be controlled in various other ways without departing from the scope of this disclosure, for example, using a hot-gas bypass, controlling suction valves, controlling the expansion valve, controlling condenser flow, or the like. It is appreciated that the setpoint temperature can relate to controlling a temperature within the internal space or climate controlled space, a temperature of a product in the internal space or climate controlled space, or a calculated or predicted value of a temperature, for example, a mean-kinetic temperature or arithmetic mean temperature, or any combination thereof.

In another embodiment, in the cooling mode, the climate controller is configured to control the compressor 210 in a start/stop mode to operate in a periodic cycle in which during each cycle the compressor 210 is configured to compress the working fluid for a first period of time and then the compressor 210 is configured to stop compressing the working fluid for a second period of time. The compressor 210 will continue to cycle between compressing the working fluid and not compressing the working fluid until the temperature within the climate controlled space reaches the desired setpoint temperature. In some embodiments, the compressor 210 is configured to compress the working fluid and direct the compressed working fluid from the compressor 210 to the condenser 214 during the start portion and configured to not compress working fluid during the stop portion. In some embodiments, during the stop portion of the start-stop cooling mode fan(s) of the condenser 214 and the evaporator 218 are turned off and are not operating. It is appreciated that the periodic cycle may be a set number of cycles between start/stop or may be adjustable based on the temperature in the climate controlled space. In an embodiment, the number of cycles may be dependent on the temperature band for starting and stopping the compressor, in which a larger band would necessitate a longer cycle. In other embodiments, the cycle may be interrupted, for example, if the temperature is outside of temperature boundaries for the cargo.

In another embodiment, the climate controller is configured operate in a temperature recovery mode after certain conditions or events trigger the operation of the temperature recovery mode to quickly return the temperature of the climate controlled space to the desired operational conditions, for example, to maintain the cargo at the desired temperature or MKT. For example, after a door opening event of the climate controlled space, e.g., for the removal or storage of the cargo in the climate controlled space during transport, the temperature of the climate controlled space will increase based on the ambient temperature of the outside environment. As such, the climate controller will instruct the transport climate control system to increase the system cooling capacity to lower the temperature of the climate controlled space, for example, by increasing compressor speed or condenser fan speed. Similarly, after a defrost event, the temperature of the climate controlled space may be increased beyond the setpoint temperature for the climate controlled space, such that the climate controller will instruct the transport climate control system to increase the system cooling capacity. As discussed above, however, there is a tradeoff between climate control performance and energy use. While the transport climate control system can quickly reach the setpoint temperature during the temperature recovery mode, for example, by running the compressor and/or condenser fan(s) at maximum speed, such operation of the compressor and/or condenser fan(s) may deplete the availability of the energy for the transport unit, e.g., stored in the batteries, resulting in the transport climate control system not being able to provide climate control for the entirety of routes, e.g., delivery of the cargo to the end user, or unnecessarily waste energy.

Figure 3:
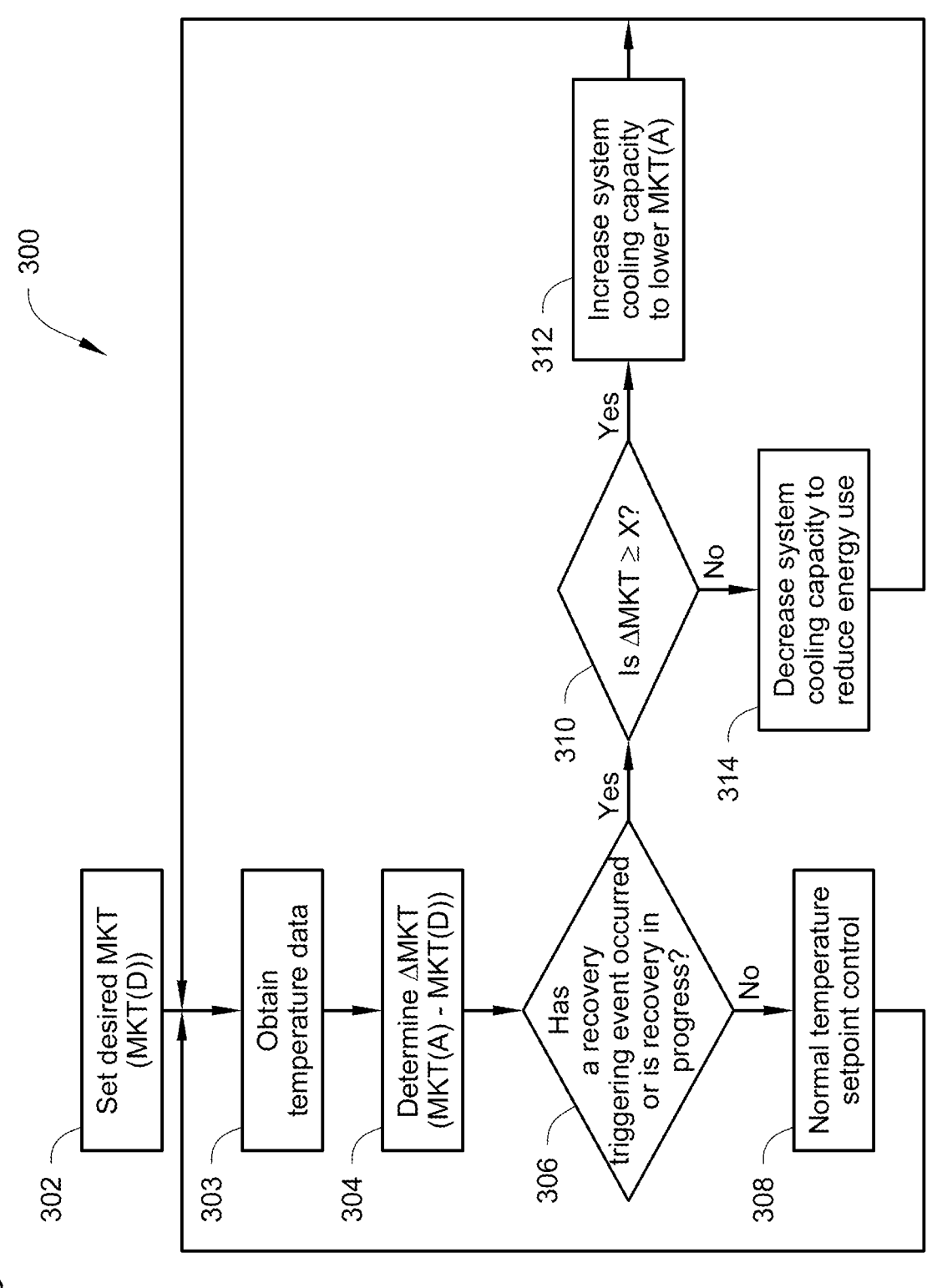
FIG. 3 is a flow chart illustrating a method for controlling a transport climate control system during a temperature recovery in the climate controlled space, according to one embodiment.

FIG. 3 shows a flowchart of a method 300 of operating the transport climate control systems 100, 124, 135 shown in FIGS. 1A-1C, according to an embodiment. The transport climate control system is able to provide climate control and maximize energy use for the transport unit based on the target MKT setpoint and the speed of recovery. It is appreciated that the climate controlled space may include at least a temperature sensor provided inside the climate controlled space or on or near the cargo products. Additional sensors may also be included, for example, sensors for measuring humidity and/or ambient temperature, proximity sensors, door opening sensors, or the like. In an embodiment, the temperatures from the temperature sensors may be averaged to determine the MKT, or the highest temperature reading may be used to calculate the MKT to ensure product quality for all of the cargo product in the climate controlled space.

As shown in FIG. 3, the method begins at 302, whereby, in an embodiment, a controller is configured to receive a setpoint for the Mean Kinetic Temperature (MKT) that can be input by a user. Alternatively, or in addition to the above, the user may be able to select the cargo type from a list that has a corresponding setpoint for the MKT. The MKT is used to evaluate the effectiveness of climate control and is representative of the cumulative thermal stress experienced by the cargo products, in which increased weighting is provided to higher temperature excursions. As such, the controller, by controlling to the MKT setpoint, is able to control the total amount of thermal stress that is applied to the cargo products to still meet customer transportation stability, safety, and/or quality control metrics, but is balanced with the amount of energy used for climate control. Thus, the setting of the MKT setpoint provides a user or customer an intuitive value that not only provides climate control but also saves on energy consumption by maximizing the amount of thermal stress that can be experienced by the cargo product to avoid unnecessary climate control. The method proceeds to 303.

At 303, the controller is configured to obtain temperature data from the temperature sensor(s) located in the climate controlled space at predetermined time intervals, e.g., via a timing/clocking function of the controller. The method then proceeds to 304.

At 304, the controller is configured to determine the MKT using EQ. 1, in which R can be estimated to be the universal gas constant $8.3144 \times 10^{-3}$ kJ per mol per degree K, while $\Delta H$ can be estimated to be 83.144 kJ per mol which is the activation energy for breaking most covalent bonds or other activation energy that is specific for the cargo product (e.g., 59.4 kJ/mol for blueberries, 43 kJ/mol for broccoli, or the like). It is appreciated that the activation energy provided herein are only examples and is not intended to be limiting, but will be dependent on the specific cargo product. The activation energy can be inputted or pre-selected for specific cargo product from, for example, a drop-down list. While the predetermined time intervals may be the same period of time, it is appreciated that the time intervals may also be different. The controller then determines a ΔMKT, as a difference between the MKT setpoint and the actual MKT in the climate controlled space determined from the temperature data from the climate controlled space collected during the time intervals. It is appreciated that the MKT can be the actual MKT as calculated from the temperature data at the current point in time or can be an estimated MKT, e.g., predicted at the end of a recovery event. In an embodiment, the estimated MKT can use a dynamic model of the transport climate control system to predict the temperature over time for the recovery and estimate the resulting MKT. The method proceeds to 306.

At 306, the controller is configured to obtain status data to determine if a predetermined recovery triggering event occurs or is in progress for the climate controlled space. At least a door (e.g., the compartment door or the cabin door) is provided for the climate controlled space. In one embodiment, the predetermined triggering event can be, for example, the ambient temperature, the temperature and/or humidity within the climate controlled space, the climate control (e.g., refrigerating) set point, door opening event (sensor), door closing event (sensor), location of the transport unit, current and/or projected weather and/or traffic conditions, etc. It will be appreciated that when the predetermined triggering event refers to a temperature (e.g., the climate controlled space temperature and/or the ambient temperature) or humidity (e.g., the climate controlled space humidity level and/or the ambient humidity level), it means that the temperature is at or exceeds a predetermined temperature (or humidity level).

It will be appreciated that the predetermined triggering event can be obtained from, e.g. a sensor (e.g., temperature sensor, door opening/closing sensor), a meter, a GPS (Global Positioning System), etc. It will also be appreciated that the sensor or meter can be on-board (within the climate controlled space), or can require a connection to a remote service/device. The status data can be, for example, how many times (i.e., the number) the predetermined triggering event occurs (e.g., how many times the door is opened), and/or how long (e.g., the duration) each time the predetermined triggering event occurs (e.g., how long each time the door is opened).

If a recovery triggering event has not occurred and a recovery is not in progress, the method proceeds to 308, in which the controller controls the transport climate control system to maintain temperature control, e.g., at the temperature or MKT setpoint. If the recovery triggering event has occurred or a recovery is in progress, the method proceeds to 310.

At 310, the controller adjusts, e.g., increases or decreases, the system cooling capacity of the transport climate control system to control the mean kinetic temperature to the mean kinetic temperature setpoint. Such control can include determining whether or not the difference between the MKT setpoint and the actual MKT is greater than or equal to a first threshold value. The threshold value may be based on the transport climate control system capabilities, compressor performance, ambient temperature, etc., and preferably is some margin of safety less than the desired MKT setpoint. Alternatively, the threshold value may increase toward the desired MKT over time as recovery proceeds to completion. Such controls can be based on the temperature difference of the MKT from setpoint and can allow the controller to track the desired MKT trajectory. If the controller determines that the AMKT is not greater than or equal to the first threshold value, the controller instructs the climate control system at 314 to decrease system cooling capacity to maximize the available thermal load that can be experienced by the cargo products to save on energy usage, e.g., optimize energy use. For example, the controller may instruct the compressor to decrease speed at predetermined increments, e.g., 500 rpm intervals, or may instruct the condenser fans to decrease speed. By decreasing the system cooling capacity, the transport unit recovers slowly so that energy usage is optimized by not wasting or unnecessarily using cooling capacity when not needed. The method then returns to 304 to continue the iterative method.

If the controller determines that the AMKT is greater than or equal to the first threshold value, the controller instructs the climate control system at 312 to increase system cooling capacity to lower the actual MKT in the climate controlled space. For example, the controller may instruct the compressor to increase speed, and may instruct the condenser fans to increase speed. By increasing the system cooling capacity, the transport unit may be able to recover quickly, so that the cargo products are ensured to meet customer quality control metrics. The method then returns to 304 to continue the iterative method.

As such, the method 300 is provided to increase or decrease the speed of the recovery based on ΔMKT. That is, the method 300 is used to control climate in the climate controlled space to recover quickly if the system is near or at the MKT setpoint to ensure the cargo product quality requirement or to recover slowly if the MKT is greater than the first threshold value to maximize energy used for climate control.

It is appreciated that the method 300 may proceed and be iterated at selected time intervals, e.g., every one minute, one second, etc., based on the time required for the climate controlled space to reach an equilibrium temperature. The method 300 may then be iterated until the MKT setpoint is obtained. In another embodiment, 310, 312, and 314 may form a closed loop circuit control, in which at least one of 312 or 314 are iterated until the actual MKT reaches the MKT setpoint. After the MKT setpoint is reached, this loop may return to 304 or another operation mode.

Figure 4:
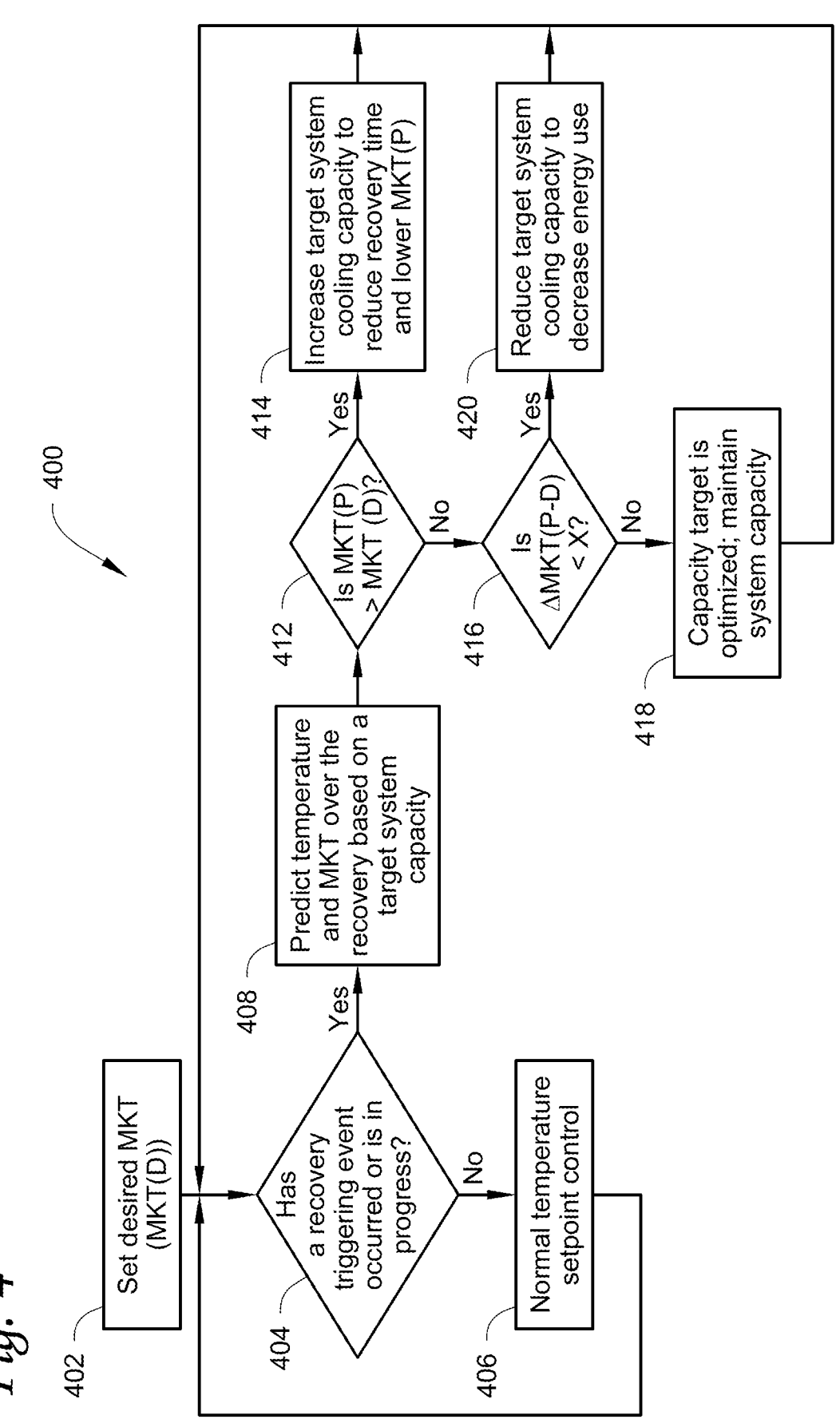
FIG. 4 is a flow chart illustrating a method for controlling a transport climate control system during a temperature recovery in the climate controlled space, according to another embodiment.

FIG. 4 shows a flowchart of another method 400 of operating the transport climate control systems 100, 124, 135 shown in FIGS. 1A-1C, according to an embodiment. The transport climate control system is able to provide climate control and maximize energy use for the transport unit based on the target MKT setpoint and the speed of recovery. It is appreciated that the climate controlled space may include at least a temperature sensor provided inside the climate controlled space or on or near the cargo products. Additional sensors may also be included, for example, sensors for measuring humidity and/or ambient temperature, proximity sensors, door opening sensors, or the like. In this embodiment, the controller is programmed to predict the temperature in the climate controlled space and predict the MKT as a function of time for recovery to the setpoint temperature based on a system cooling capacity. It is appreciated that the system cooling capacity can be estimated or known based on the transport climate control system elements, e.g., compressor capacity, condenser/evaporator enthalpy change, refrigerant pressure, refrigerant temperature, water temperatures, etc.

As shown in FIG. 4, the method begins at 402, whereby, in an embodiment, a controller is configured to receive a setpoint for the Mean Kinetic Temperature (MKT) that is input by a user. Alternatively, or in addition to the above, the user may be able to select the cargo type from a list that has a corresponding setpoint for the MKT. The method proceeds to 404.

At 404, the controller is configured to obtain status data and determine if a predetermined recovery triggering event occurs or is in progress for the climate controlled space of the transport unit. At least a door (e.g., the compartment door or the cabin door) is provided for the climate controlled space. In one embodiment, the predetermined triggering event can be, for example, the ambient temperature, the temperature and/or humidity within the climate controlled space, the climate control (e.g., refrigerating) set point, door opening event (sensor), door closing event (sensor), location of the transport unit, current and/or projected weather and/or traffic conditions, etc. It will be appreciated that when the predetermined triggering event refers to a temperature (e.g., the climate controlled space temperature and/or the ambient temperature) or humidity (e.g., the climate controlled space humidity level and/or the ambient humidity level), it means that the temperature is at or exceeds a predetermined temperature (or humidity level).

It will be appreciated that the predetermined triggering event can be obtained from, e.g. a sensor (e.g., temperature sensor, door opening/closing sensor), a meter, a GPS (Global Positioning System), etc. It will also be appreciated that the sensor or meter can be on-board (within the climate controlled space), or can require a connection to a remote service/device. The status data can be, for example, how many times (i.e., the number) the predetermined triggering event occurs (e.g., how many times the door is opened), and/or how long (e.g., the duration) each time the predetermined triggering event occurs (e.g., how long each time the door is opened).

If a recovery triggering event has not occurred and a recovery is not in progress, the method proceeds to 406, in which the controller controls the transport climate control system to maintain temperature control, e.g., at the temperature or MKT setpoint. If the recovery triggering event has occurred or a recovery is in progress, the method proceeds to 408.

At 408, the controller is configured to predict (e.g., calculate) temperature and the instantaneous MKT, e.g., at a single time t, along various times during recovery to the MKT setpoint. That is, since the temperature from a recovery triggering event (e.g., door open or defrost) generally causes the temperature in the climate controlled space to increase, the controller can determine or predict, as a function of time, the temperature and MKT increase over time until the MKT setpoint is reached, e.g., via a linear or exponential model approximating the physical relationships of the thermal dynamic system. Two non-limiting examples are provided below.

A simple model could be that the system temperature recovers at a constant rate based on the cooling capacity $$\left(\text{e.g.}\frac{dT}{dt} = KQ, \text{ and } T(t) = Q = KQt + T_o\right).$$

If the capacity is kept constant during the recovery period, and the sampling of temperature data can be approximated as continuous, then the MKT as a function of time can be calculated directly (see the equation below), and the change in MKT over the course of the recovery can be determined by evaluating at the recovery completion time (from time $t_i$ to $t_r$) and using the collected temperature data used to calculate the current MKT (from time $t_0$ to $t_i$).

$$T_K = \frac{\frac{\Delta H}{R}}{-\ln\left(\frac{\sum_{t_0}^{t_i} t_n e^{\left(\frac{-\Delta H}{RT_n}\right)} + \int_{t_i}^{t_r} e^{\left(\frac{-\Delta H}{RT(t)}\right)}dt}{t_r}\right)}$$

In the above equations, the symbols represent the following:
$t_0$—time of the trip start (normally zero)
$t_i$—time of recovery event starting
$t_r$—time of recovery event end (due to reaching the setpoint)
$T(t)$—Predicted temperature as a function of time over the course of the recovery
$T_n$—Collected temperature data
In another example, the dynamics of the conditioned space are approximated by the heat balance which leads to the first order differential equation. Assuming that the heat transfer, heat flux, and the heat capacity of the conditioned space can be estimated, then the predicted temperature values during the recovery can be determined, as follows:

$$\Delta Q = Q_{in} - Q_{out}$$

$$C_{space}\dot{T}_{space} = Q_{reefer} - UA(T_{space} - T_{ambient})$$

Assuming a constant cooling of the conditioned space ($Q_{reefer}$), a solution to the first-order differential equation model for temperature at a particular time during the recovery thus is:

$$T_{box}(t) = T_{ambient} + \frac{Q_{reefer}}{UA} + \left(T_o - T_{ambient} - \frac{Q_{reefer}}{UA}\right)e^{\frac{-UAt}{c_{box}}},$$

where: $T_{box}(0) = T_o$
In the above equations, the symbols represent the following:
T—Temperature
$T_{ambient}$—Ambient temperature
t—Time
Q—Heating or Cooling, heat flux
UA—Heat transfer coefficient times area (represents how easily heat is transferred into/out of the box)
$C_{box}$—Heat capacity of the conditioned space.
The change in MKT over the course of the recovery can then be predicted by taking a set of times and calculating the predicted temperatures and then calculating the MKT via EQ 1.
After the change in MKT from the recovery is determined, the method then proceeds to 410.

The controller is configured to determine the predicted MKT during and at the end of the recovery. For example, if the system cooling capacity is run at maximum performance, e.g., max compressor speed and max condenser fan(s) speed, the predicted MKT can reach the MKT setpoint quickly, e.g., to minimize the effect of the recovery event on the MKT. Alternatively, the system cooling capacity may be run at minimum performance to maintain MKT below the MKT setpoint but conserve energy use, in which the predicted MKT would reach the MKT setpoint over a longer period of time. However, since the MKT is a way of expressing the thermal load on the cargo product and does not necessarily have to be maintained as low as possible, a balance may be found between system cooling capacity performance (and speed) and the energy used by the transport climate control system to reach the MKT setpoint. As such, an optimal path, e.g., MKT curves based on system capacity control and time to recovery, may be determined and/or selected from the various predicted MKT values for the different time intervals that not only maintains the MKT to meet customer stability, safety, and quality control metrics, but also saves energy by not running the transport climate control system with unnecessary energy usage.

In another embodiment, since the predicted time to recovery can be determined and the transport unit route is known, e.g., delivery route, the controller may determine whether the predicted time to recovery overlaps any known or expected recovery triggering event, e.g., a door opening event for another delivery drop off. If the known or expected recovery triggering event overlaps the predicted time to recovery, the controller can increase system cooling capacity to lower the MKT within any time interval to ensure that the cargo product meets the product stability, safety, and quality control metric.

Based on the predicted temperature and MKT, the controller can adjust, e.g., increase or decrease, the system cooling capacity of the transport climate control system to control the predicted mean kinetic temperature to the mean kinetic temperature setpoint. The method then proceeds to 412.

At 412, the controller is configured to determine whether at any time during the recovery, t, the MKT is greater than the MKT setpoint, and preferably, whether during the whole recovery if the MKT goes over the MKT limit and/or setpoint. If the MKT is greater than the MKT setpoint at any time, t, the controller instructs the climate control system at 414 to increase a target system cooling capacity to reduce recovery time and lower the MKT(P) in the climate controlled space. For example, the controller may instruct the compressor to increase speed at predetermined increments, e.g., 500 rpm intervals, or may instruct the condenser fans to increase speed. The method then proceeds back to 404.

If the MKT is not greater the MKT setpoint at any time, t, the method proceeds to 416. At 416, the controller is configured to determine whether or not the difference between the MKT setpoint and the predicted MKT exceeds a second threshold value. The threshold value may be based on the transport climate control system capabilities, compressor performance, ambient temperature, user selection, etc., and typically ranges from 0 to 10 degrees K (or 0 to 18 deg F.), and preferably is a value between 1 and 5 degrees K (or 1.8 to 9 deg F.). If the controller determines that the ΔMKT is not less than the second threshold value, the controller instructs the transport climate control system at 418 to maintain operational parameters to maintain system cooling capacity since the capacity target is optimized for the climate controlled space. The method then returns to 404 to continue the iterative method.

If the controller determines that the ΔMKT is less than the second threshold value, the controller instructs the transport climate control system at 420 to reduce or decrease or lower the target system capacity to maximize the available thermal load that can be applied to the cargo products and reduce energy use. For example, the controller may instruct the compressor to decrease speed at predetermined increments, e.g., 500 rpm intervals, or may instruct the condenser fan(s) to decrease speed. By decreasing the system cooling capacity, energy usage is optimized by not unnecessarily using cooling capacity when not needed. The method then returns to 404 to continue the iterative method.

It is appreciated that the method 400 may proceed based on the selected optimal path and/or be iterated at selected time intervals, e.g., every minute, every second, etc. It is also appreciated that in an embodiment, at any time in which the instant or actual MKT exceeds an upper limit value, the system cooling capacity can be increased to ensure cargo product stability, safety, and quality, e.g., 10 deg K (or 18 deg F.) above MKT setpoint for the cargo product, and preferably 5 deg K (or 9 deg F.) above MKT setpoint.

Figure 5:
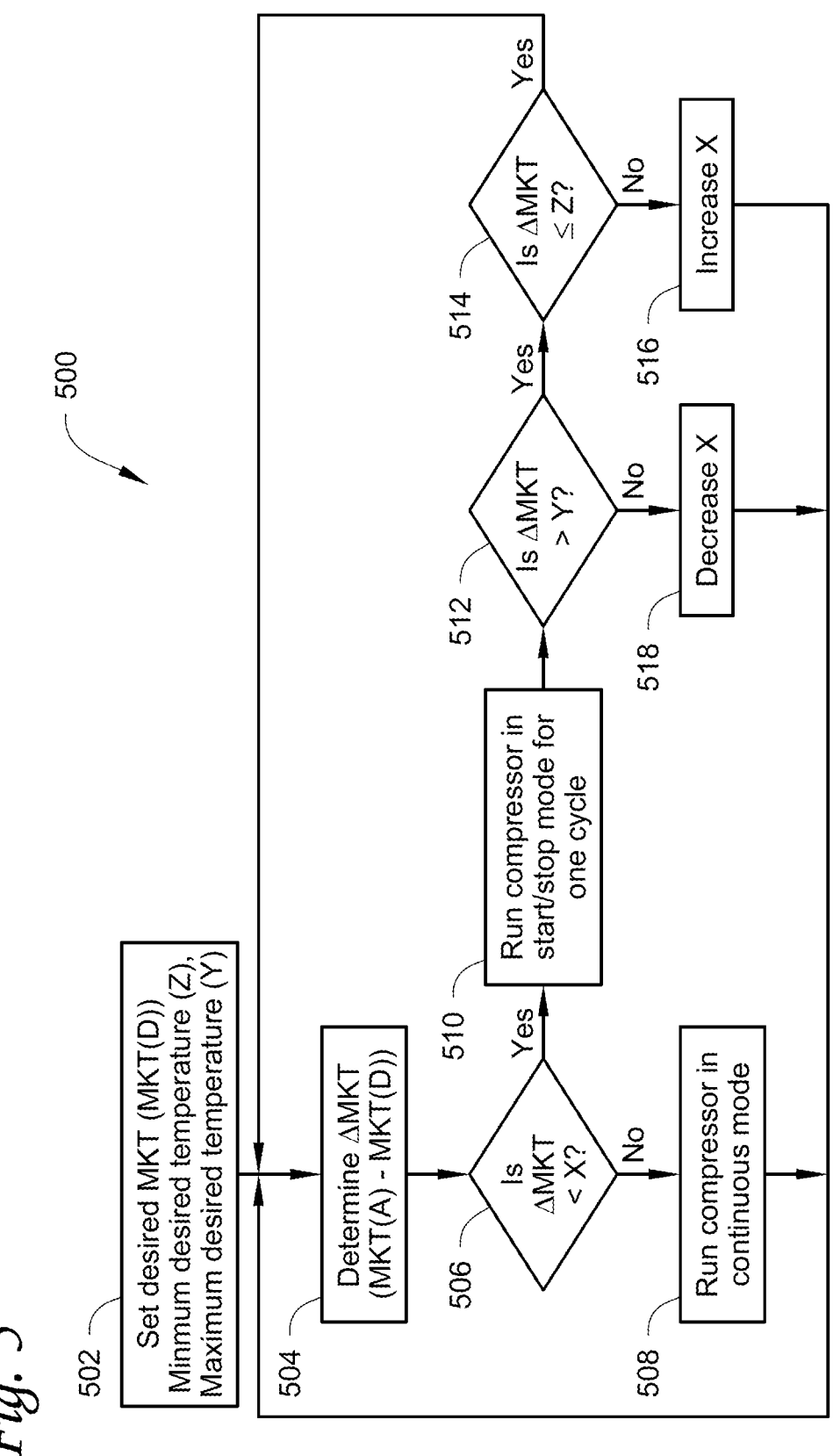
FIG. 5 is a flow chart illustrating a method for controlling a transport climate control system in a start/stop mode or continuous mode, according to one embodiment.

FIG. 5 shows a flowchart of another method 500 of operating the transport climate control systems 100, 124, 135 shown in FIGS. 1A-1C, according to an embodiment. The transport climate control system is able to provide climate control and maximize energy use for the transport unit based on the target MKT setpoint. It is appreciated that the climate controlled space may include at least a temperature sensor provided inside the climate controlled space or on or near the cargo products. Additional sensors may also be included, for example, sensors for measuring humidity and/or ambient temperature, proximity sensors, door opening sensors, or the like. In this embodiment, the controller is programmed to control the compressor in start/stop mode or continuous mode based on the MKT.

As shown in FIG. 5, the method begins at 502, whereby, in an embodiment, a controller is configured to receive a setpoint for the Mean Kinetic Temperature (MKT) that is input by a user. Alternatively, or in addition to the above, the user may be able to select the cargo type from a list that has a corresponding setpoint for the MKT. The method proceeds to 504.

At 504, the controller is configured to obtain temperature data from the temperature sensor(s) located in the climate controlled space at predetermined time intervals, e.g., via a timing/clocking function of the controller. The controller is then configured to determine the MKT using EQ. 1, in which R can be estimated to be the universal gas constant 8.3144× $10^{-3}$ kJ per mol per degree K, while ΔH can be estimated to be 83.144 kJ per mol or other value, as discussed above. While the predetermined time intervals may be the same period of time, it is appreciated that the time intervals may also be different. After the MKT is determined for a particular time interval, the controller determines a ΔMKT, as a difference between the MKT setpoint and the actual MKT determined from the temperature data from the climate controlled space. The ΔMKT can then be used to switch the operation mode of the transport climate control system between a continuous running mode and a start/stop cycle mode to control the mean kinetic temperature to the mean kinetic temperature setpoint. The method then proceeds to 506.

At 506, the controller determines whether the ΔMKT is less than a third threshold value and/or whether the compressor is in a start/stop cycle. The threshold value may be initially based on the transport climate control system capabilities, compressor performance, ambient temperature, etc., and typically ranges from 0 to 10 degrees K (or 0 to 18 deg F.), and preferably is a value between 1 and 5 degrees K (or 1.8 and 9 deg F.). If the controller determines that the ΔMKT is not less than the third threshold value and not in a start/stop cycle, the method proceeds to 508 in which the controller runs the compressor in continuous mode, e.g., based on the MKT setpoint. In the continuous mode, the controller controls the speed of the compressor to either maintain an MKT or temperature setpoint. In an embodiment, the compressor can be a variable speed compressor or have two speed ranges, e.g., low speed and high speed, for operating the compressor. As such, since the climate control circuit is run in a continuous mode, the MKT will be lowered, so that the fluctuations in the MKT during the start/stop mode, does not adversely affect the product stability, safety, or quality of the cargo products. The method then returns to 504 to continue the iterative method.

If the controller determines that the ΔMKT is less than the third threshold value or is currently in a start/stop cycle, the controller runs the compressors in a start/stop mode at 510. When the start/stop cycle has completed, the method then proceeds to 512.

At 512, the controller determines whether the AMKT is greater than a fourth threshold value. If the AMKT is not greater than the fourth threshold value, the value of the third threshold value is decreased, e.g., at 0.25, 0.5, 1, 1.5, or 2, or the like increments at 518/506. While running the compressor in start/stop mode saves energy, the temperature control is less consistent and/or has more variation in temperature and may result in a higher MKT than running the compressor in continuous mode. As such, by decreasing the value of the third threshold value, the compressor will run in start/stop mode less frequently to ensure the MKT meets the customer's stability, safety, and/or quality control metric. The method then returns to 504 to continue the iterative method.

If at 512, the controller determines that the ΔMKT is greater than the fourth threshold value, the method proceeds to 514. At 514, the controller determines whether ΔMKT is less than or equal to a fifth threshold value. If ΔMKT is less than or equal to the fifth threshold value, the operational parameters of the compressor run mode is maintained and the method is returned to 504 to continue the iterative method.

If at 514, the controller determines that the AMKT is not less than or equal to the fifth threshold value, the value of the third threshold value is increased, e.g., at 0.25, 0.5, 1, 1.5, or 2, or the like increments at 516/506. As such, since the cargo product has sufficient thermal capacity for thermal loading, the compressor can be run in start/stop mode more frequently to save energy and still ensure that the MKT meets the cargo product customer stability, safety, and/or quality control metric.

It is appreciated that the method 500 may proceed and be iterated at selected time intervals, e.g., every five minutes, one minute, one second, etc., based on the time required for the climate controlled space to reach an equilibrium temperature.

It is also appreciated that while the compressor is run in the selected start/stop mode until the start/stop cycle is completed, if at any time, the instant MKT, e.g., at a time t1, exceeds an upper limit value, the start/stop cycle may be interrupted so that system cooling capacity can be increased to ensure cargo product quality, e.g., 10 deg K (or 18 deg F.) above MKT setpoint for cargo product, and preferably 5 deg K (or 9 deg F.) above MKT setpoint.

It is appreciated that the third threshold value X, fourth threshold value Y, and fifth threshold value Z can be any value, in which Y≥Z≥X is always true. For example, in an embodiment, Y=0, X=−2, and Z=(X+Y)/2. While the disclosure herein is provided as an illustrative example, the disclosure of the example is not intended to limit the values of the threshold values.

Figure 6:
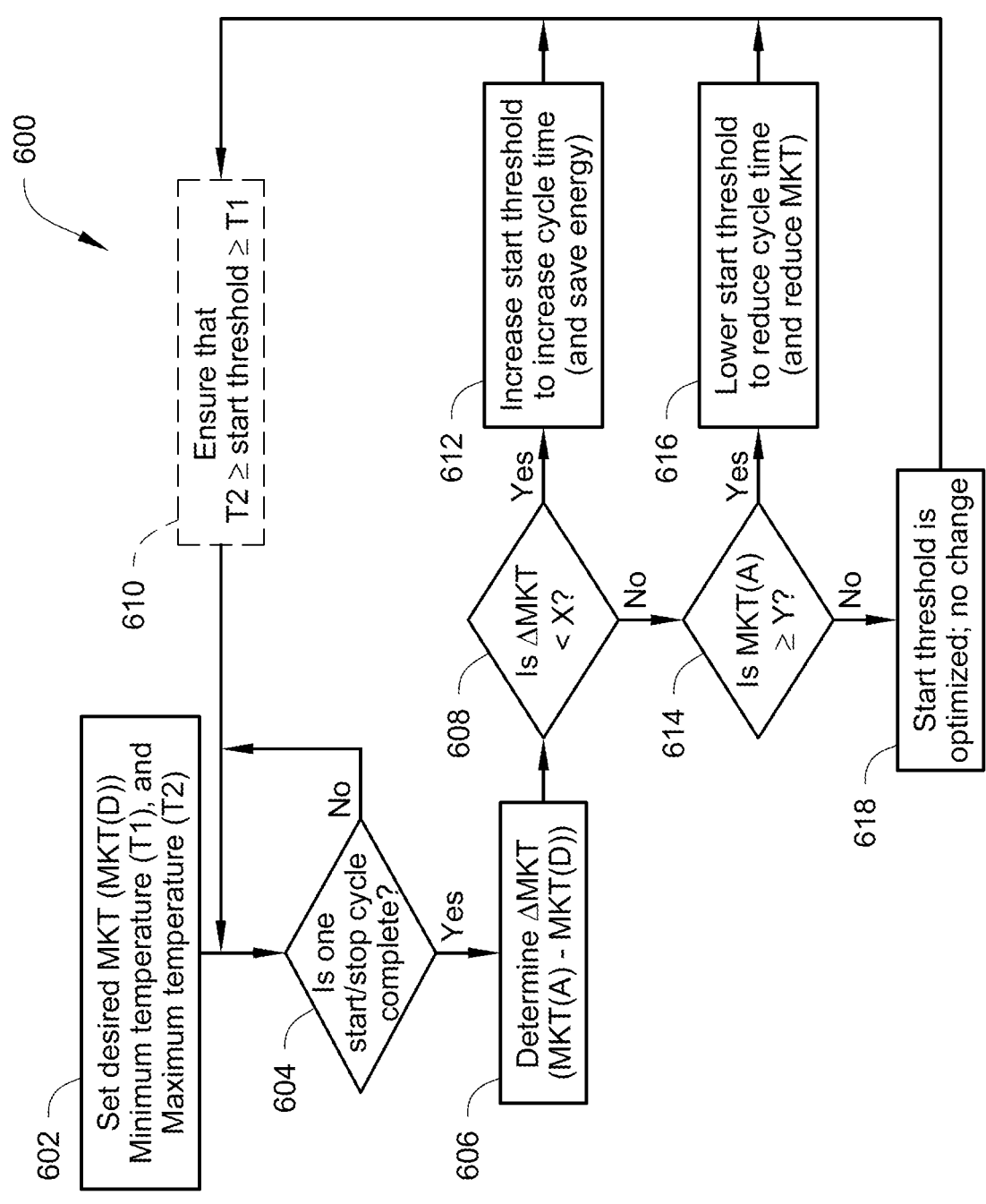
FIG. 6 is a flow chart illustrating a method for controlling a transport climate control system in a start/stop mode, according to one embodiment.

FIG. 6 shows a flowchart of another method 600 of operating the transport climate control systems 100, 124, 135 shown in FIGS. 1A-1C, according to an embodiment. The transport climate control system is able to provide climate control and maximize energy use for the transport unit based on the target MKT setpoint. It is appreciated that the climate controlled space may include at least a temperature sensor provided inside the climate controlled space or on or near the cargo products. Additional sensors may also be included, for example, sensors for measuring humidity and/or ambient temperature, proximity sensors, door opening sensors, or the like. In this embodiment, the controller is programmed to control the compressor in start/stop mode based on the MKT.

As shown in FIG. 6, the method begins at 602, whereby, in an embodiment, a controller is configured to receive a setpoint for the Mean Kinetic Temperature (MKT) that is input by a user. The method also includes setting a minimum temperature T1 and a maximum temperature T2, in which a start threshold temperature for starting and stopping the compressor is between the minimum temperature T1 and the maximum temperature T2. The controller is configured to start the compressor when the temperature in the climate controlled space reaches the start threshold temperature and stop the compressor when the temperature reaches a first temperature T1. The first temperature T1 can be set as the user's temperature setpoint and the second temperature T2 can be a default value set by the selected cargo product or can also be set by the user. In an embodiment, the first temperature T1 and the second temperature T2 can be initially set based on the system cooling capacity and/or be based on an initial value above and below the desired MKT setpoint, e.g., 10 deg K (or 18 deg F.) above and below the MKT setpoint, preferably 5 deg K (or 9 deg F.) above and below the MKT setpoint, and most preferably 2.8 deg K (or 5 deg F.) above and below the MKT setpoint. It is appreciated that the start restart thresholds may also be set above and below the MKT setpoint at intervals that are not equal, since higher temperature excursions can impact the thermal load more than lower temperature excursions. For example, the temperature start for the compressor may be set 2.8 deg K (or 5 deg F.) above the MKT setpoint, whereas the temperature stop may be set 5 deg K (or 9 deg F.) below the MKT setpoint. It is appreciated that start/stop temperatures are only given as examples and is not intended to limit the scope of the disclosure, for example, the values may be set by the user at different values. It is also appreciated that the start/stop temperatures may be the actual temperature in the climate controlled space or the MKT. Alternatively, or in addition to the above, the user may be able to select the cargo type from a list that has a corresponding setpoint for the MKT and minimum temperature T1 and maximum temperature T2 for the cargo product along with an initial start threshold temperature.

The method further includes increasing or decreasing the start temperature and/or the stop temperature to control the mean kinetic temperature to the mean kinetic temperature setpoint. That is, it is appreciated that while the above disclosure is related to a start threshold temperature, the method can also be directed to stop threshold temperature or both a stop and start threshold temperature. The method then proceeds to 604.

At 604, the controller is configured to determine whether or not the compressor has completed running in start/stop mode, e.g., completed a start/stop cycle. When the controller determines that compressor has completed the start/stop cycle, the method proceeds to 606.

At 606, the controller is configured to obtain temperature data from the temperature sensor(s) located in the climate controlled space at predetermined time intervals, e.g., via a timing/clocking function of the controller. The controller is then configured to determine the MKT using EQ. 1, in which R can be estimated to be the universal gas constant 8.3144×

$10^{-3}$ kJ per mol per degree K, while ΔH can be estimated to be 83.144 kJ per mol or other value, as discussed above. While the predetermined time intervals may be the same period of time, it is appreciated that the time intervals may also be different. After the MKT is determined for a particular time interval, the controller determines a ΔMKT, as a difference between the MKT setpoint and the actual MKT determined from the temperature data from the climate controlled space. The method proceeds to 608.

At 608, the controller determines whether the ΔMKT is less than a sixth threshold value. The threshold value may be based on the transport climate control system capabilities, compressor performance, ambient temperature, etc., and typically ranges from 1 to 10 degrees K (or 1.8 to 18 deg F.), and preferably is a value between 1 and 5 degrees K (or 1.8 and 9 deg F.).

If the controller determines that the ΔMKT is less than the sixth threshold value, the controller at 612 increases a start restart threshold temperature for starting the compressor so that the restart threshold is increased to increase the cycle time and save energy. It is appreciated that the start threshold value is a value between the minimum temperature T1 and the maximum temperature T2, e.g., MKT threshold value, and preferably is a value between 3 and 5 degrees K (or 5.4 and 9 deg F.) below the MKT threshold value. The method then returns to 604 to continue the iterative method.

In an embodiment, between 612 and 604, the method may include 610, in which the controller ensures that the maximum temperature T2 is greater than or equal to the start threshold temperature and the start threshold temperature is greater than or equal to the minimum temperature T1. The method then proceeds to return to 604.

If at 608, the controller determines that the ΔMKT is not less than the sixth threshold value, the method proceeds to 614. At 614, the controller determines whether the actual MKT is greater than or equal to a seventh threshold value. If the controller determines that the actual MKT is greater than or equal to the seventh threshold value, the controller at 616 decreases the start restart threshold temperature for starting the compressor, so that the restart threshold is decreased to decrease the cycle time and reduce the MKT. The method then returns to 604 (or proceeds to 610) to continue the iterative method.

If at 614, the controller determines that the actual MKT is not greater than or equal to the seventh threshold value, the controller at 618 maintains the start threshold temperature since the system is optimized. The method then returns to 604 (or proceeds to 610) to continue the iterative method.

It is appreciated that at 612, 616, 618, the increase and/or decrease of the restart threshold temperature for starting the compressor may be at any value between 0.25 and 5 deg K depending on the requirements for the transport climate control system. It is appreciated that the method 600 may proceed and be iterated at selected time intervals, e.g., every five minutes, one minute, one second, etc., based on the time required for the climate controlled space to reach an equilibrium temperature.

It is also appreciated that since the method 500 and the method 600 both include controlling the compressor in a start/stop mode, the method 500 and method 600 may be combined as a single control method. As such, while method 500 is used to determine when to run the compressor in start/stop mode, method 600 is used to control the compressor while in start/stop mode.

Figure 7:
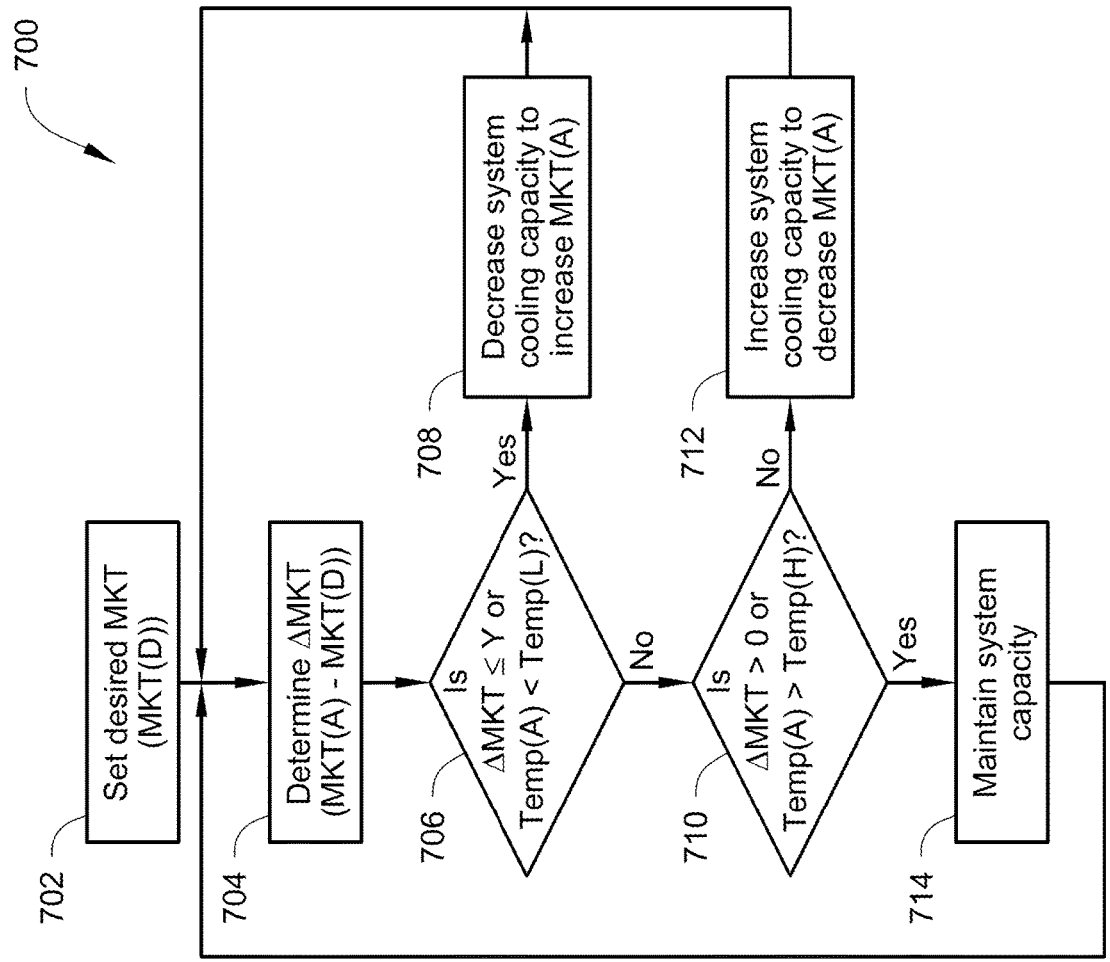
FIG. 7 is a flow chart illustrating a method for controlling a transport climate control system in a continuous mode, according to one embodiment.

FIG. 7 shows a flowchart of another method 700 of operating the transport climate control systems 100, 124, 135 shown in FIGS. 1A-1C, according to an embodiment.

The transport climate control system is able to provide climate control and maximize energy use for the transport unit based on the target MKT setpoint. It is appreciated that the climate controlled space may include at least a temperature sensor provided inside the climate controlled space or on or near the cargo products. Additional sensors may also be included, for example, sensors for measuring humidity and/or ambient temperature, proximity sensors, door opening sensors, or the like. In this embodiment, the controller is programmed to control the compressor continuously based on the MKT at a high temperature range and a low temperature range. That is, the controller controls the compressor to run within an acceptable temperature range (high or low) while keeping the MKT acceptably low and below a maximum MKT to save on energy while maintaining product stability, safety, and/or quality. The controller can choose to run the compressor at the high end of the acceptable temperature range if the MKT is low or run at the low end of the acceptable temperature range to reduce the MKT to compensate for high temperature excursions, e.g., door open events during delivery. It is appreciated that the term continuous may refer to a compressor that includes a variable frequency drive and can be run at various speeds or a compressor that has a low speed range and a high speed range, but is not limited thereto.

As shown in FIG. 7, the method begins at 702, whereby, in an embodiment, a controller is configured to receive a setpoint for the Mean Kinetic Temperature (MKT) that is input by a user. Alternatively, or in addition to the above, the user may be able to select the cargo type from a list that has a corresponding setpoint for the associated MKT value. The method proceeds to 704.

At 704, the controller is configured to obtain temperature data from the temperature sensor(s) located in the climate controlled space at predetermined time intervals, e.g., via a timing/clocking function of the controller. The controller is then configured to determine the MKT using EQ. 1, in which R can be estimated to be the universal gas constant 8.3144× $10^{-3}$ kJ per mol per degree K, while ΔH can be estimated to be 83.144 kJ per mol or other value, as discussed above. While the predetermined time intervals may be the same period of time, it is appreciated that the time intervals may also be different. After the MKT is determined for a particular time interval, the controller determines a ΔMKT, as a difference between the MKT setpoint and the actual MKT determined from the temperature data from the climate controlled space. The method proceeds to 706.

At 706, the controller is configured to determine whether or not the ΔMKT is less than an eighth threshold value or if the actual temperature is less than a low temperature threshold value. The low temperature threshold value may be based on a range predefined for the cargo product or set by the user, e.g., low temperature end of the maximum range, e.g., 10 deg K below the MKT setpoint, to save energy. It is appreciated that in some embodiments, the temperature in the climate controlled space can be maintained above a minimum temperature threshold value using additional components, for example, an electric heater bar. The minimum temperature threshold value can be based on the specific cargo product or be the freezing point temperature of 32 deg F. or 0 deg C. For example, if the temperature in the climate controlled space decreases below the absolute low temperature threshold value, e.g., on a cold day, the heater bar can be used to raise the temperature in the climate controlled space to avoid spoilage, e.g., due to freezing.

If at 706, the controller determines that the ΔMKT is less than or equal to the eighth threshold value or the actual temperature of the climate controlled space is less than the low temperature threshold value, the controller at 708 decreases the system cooling capacity, so that the MKT is increased. As such, if the controller is running at the high end of the temperature range, the increase of the MKT saves energy of the system. The method then returns to 704 to continue the iterative method.

If at 706, the controller determines that the $\Delta$MKT is not less than or equal to the eighth threshold value or the actual temperature is not less than the low temperature threshold value, the method proceeds to 710. At 710, the controller determines whether the $\Delta$MKT is greater than zero or if the actual temperature of the climate controlled space is greater than the high temperature threshold value. The high temperature threshold value may be based on a range predefined for the cargo product or set by the user, e.g., high temperature end of the maximum range, e.g., 10 deg K above the MKT setpoint. If the controller determines that the $\Delta$MKT is greater than zero or the actual temperature is greater than the high temperature threshold value, the method proceeds to 714 to maintain the operational parameters for controlling the transport climate control system to maintain system cooling capacity. The method the returns to 704.

If at 710, the controller determines that the $\Delta$MKT is not greater than zero or the actual temperature is not greater than the high temperature threshold value, the controller at 712 increases the system cooling capacity such that the decrease of the MKT may be able to compensate for future high temperature excursions, for example, due to a door open event during a delivery. The method then returns to 704 to continue the iterative method.

It is appreciated that while the terms first threshold value, second threshold value, third threshold value, fourth threshold value, fifth threshold value, sixth threshold value, seventh threshold value, and eighth threshold value have been discussed as being separate and distinct values, it is appreciated that the threshold values may include the same threshold value used in the various embodiments.

It is also appreciated that while the methods 300, 400, 500, 600, and 700 have been discussed as various embodiments, it is appreciated that the methods can be combined and/or stored in the controller for controlling the transport climate control system based on the needs of climate control for the cargo products.

Aspects:

It is understood that any of aspects 1-11 may be combined together and/or with any of aspects 12-18.

Aspect 1. A method of operating a transport climate control system used to provide climate control within a climate control space of a transport unit, the method comprising:

setting a mean kinetic temperature setpoint to control the transport climate control system;

determining, using a controller, a mean kinetic temperature in the climate controlled space;

determining, using the controller, a difference between the mean kinetic temperature setpoint and the mean kinetic temperature in the climate controlled space; and controlling the transport climate control system based on at least the difference between the mean kinetic temperature setpoint and the mean kinetic temperature in the climate controlled space to regulate the mean kinetic temperature in the climate controlled space.

Aspect 2. The method of Aspect 1, further comprising:

determining whether a temperature recovery triggering event has occurred or is in progress for the transport unit; and when the temperature recovery triggering event has occurred, controlling the transport climate control system to optimize energy use of the transport climate control system and/or to control the mean kinetic temperature to the mean kinetic temperature setpoint.

Aspect 3. The method of Aspect 2, wherein the controlling the transport climate control system comprises:

adjusting a system cooling capacity of the transport climate control system to control the mean kinetic temperature to the mean kinetic temperature setpoint, which can include:

determining if the difference is greater than or equal to a first threshold value, wherein when the difference is greater than or equal to the first threshold value, increasing a system cooling capacity of the transport climate control system to lower the mean kinetic temperature in the climate controlled space, and when the difference is not greater than or equal to the first threshold value, decreasing the cooling capacity of the transport climate control system.

Aspect 4. The method of Aspect 1, wherein the controlling the transport climate control system of the transport climate control system comprises:

determining whether a temperature recovery triggering event has occurred or is in progress for the transport unit;

when the temperature recovery triggering event has occurred, the method further comprising:

predicting the mean kinetic temperature and a temperature as a function of time, t, for recovery to the mean kinetic temperature setpoint in the climate controlled space;

determining a predictive value of the mean kinetic temperature in the climate controlled space during and at the end of the recovery, and during the recovery, adjusting a system cooling capacity of the transport climate control system to control the predicted mean kinetic temperature to the mean kinetic temperature setpoint, which can include:

wherein when the predictive value of the mean kinetic temperature is greater than the mean kinetic temperature setpoint at any of the time t, increasing a target system cooling capacity of the transport climate control system, wherein when the predictive value of the mean kinetic temperature is not greater than the mean kinetic temperature setpoint, determining if a difference between the mean kinetic temperature setpoint and the predicted value of the mean kinetic temperature is less than a second threshold value, wherein when the difference between the mean kinetic temperature setpoint and the predicted value of the mean kinetic temperature is not less than the second threshold value, maintaining operational parameters of the transport climate control system to maintain the system cooling capacity, and when the difference between the mean kinetic temperature setpoint and the predicted value of the mean kinetic temperature is less than the second threshold value, decreasing the target system cooling capacity of the transport climate control system.

Aspect 5. The method of any one of Aspects 1-4, wherein the controlling the transport climate control system comprises:

switching between a continuous running mode and a start/stop cycle mode to control the mean kinetic temperature to the mean kinetic temperature setpoint, which can include:

determining whether the difference is less than a third threshold value or whether the compressor is running in a start/stop cycle, wherein when the difference is less than the third threshold value or the compressor is running in the start/stop cycle, running the compressor in a start/stop control mode for one cycle, and when the difference is not less than the third threshold value, running the compressor in a continuous control mode;

wherein, when the compressor is running in the start/stop control mode, determining if the difference is greater than a fourth threshold value, wherein when the difference is not greater than the fourth threshold value, decreasing a value of the third threshold value, and when the difference is greater than the fourth threshold value and is not less than or equal to a fifth threshold value, increasing the value of the third threshold value.

Aspect 6. The method of claim 5, further comprising, when at any time the mean kinetic temperature in the climate controlled space is greater than the mean kinetic temperature setpoint, running the compressor in the continuous mode.

Aspect 7. The method of claim 5, wherein the value of the third threshold value that is increased or decreased is by 0.5 degree increments.

Aspect 8. The method of any one of Aspects 1-7, wherein the controlling the transport climate control system operates the compressor in a start/stop control mode and comprises:

setting a start temperature for starting the compressor and a stop temperature for stopping the compressor; and adjusting the start temperature and/or the stop temperature to control the mean kinetic temperature to the mean kinetic temperature setpoint, which can include:

determining whether a cycle of the start/stop control mode has been completed, wherein if the cycle of the start/stop control mode has been completed, determining whether the difference is less than a sixth threshold value, wherein when the difference is less than the sixth threshold value, increasing the start threshold temperature for starting the compressor, wherein when the difference is not less than the sixth threshold value and is greater than or equal to a seventh threshold value, decreasing the start threshold temperature for starting the compressor, and when the difference is not less than the sixth threshold value and is not greater than or equal to the seventh threshold value, maintaining the start threshold temperature.

Aspect 9. The method of Aspect 8, wherein the decreasing or increasing the start temperature and the stop temperature is increased or decreased in 0.5 degree increments.

Aspect 10. The method of any one of Aspects 1-9, wherein the controlling the transport climate control system comprises:

wherein an upper bound and/or a lower bound of acceptable temperatures is set, and wherein the transport climate control system controls the temperature within the set bounds to control the mean kinetic temperature to the mean kinetic temperature setpoint, which can include:

determining whether the difference between the mean kinetic temperature setpoint and the mean kinetic temperature is less than or equal to an eighth threshold value or if the temperature in the climate controlled space is less than a low temperature threshold, wherein when the difference is less than or equal to the eighth threshold value or when the temperature in the climate controlled space is less than a low temperature threshold, decreasing a system cooling capacity of the transport climate control system, when the difference is not less than or equal to the eighth threshold value or when the temperature in the climate controlled space is not less than the low temperature threshold, determining whether the difference is greater than zero or if a temperature in the climate controlled space is greater than a high temperature threshold, wherein when the difference is greater than zero or when the temperature in the climate controlled space is greater than the high temperature threshold, maintaining operational parameters of the transport climate control system to maintain the system cooling capacity, and wherein when the difference is not greater than zero or when the temperature in the climate controlled space is not greater than the high temperature threshold, increasing the system cooling capacity of the transport climate control system.

Aspect 11. The method of Aspect 10, wherein the system cooling capacity is increased or decreased by controlling at least one of a compressor speed or condenser fan speed.

Aspect 12. A transport climate control system for providing climate control within a climate controlled space of a transport unit, comprising:

a climate control circuit including a compressor;

a temperature sensor, configured to measure a temperature in the climate controlled space; and a controller, having a processor, configured to:

receive the temperature from the temperature sensor;

receive a mean kinetic temperature setpoint to control the transport climate control system;

determine a mean kinetic temperature in the climate controlled space based on the temperature from the temperature sensor;

determine a difference between the mean kinetic temperature setpoint and the mean kinetic temperate in the climate controlled space; and control the transport climate control system based on at least the difference between the mean kinetic temperature setpoint and the mean kinetic temperature in the climate controlled space to regulate the mean kinetic temperature in the climate controlled space.

Aspect 13. The transport climate control system of Aspect 12, wherein the temperature sensor is located on cargo in the climate controlled space or along an inner surface of the transport unit.

Aspect 14. The transport climate control system of any one of Aspects 12-13, wherein the controller is further configured to:

determine whether a temperature recovery triggering event has occurred or is in progress for the transport unit, when temperature recovery is occurring, adjust a system cooling capacity of the transport climate control system to control the mean kinetic temperature to the mean kinetic temperature setpoint, which can include:

wherein when the temperature recovery triggering event has occurred, determine whether the difference is greater than or equal to a first threshold value, wherein when the difference is greater than or equal to the first threshold value, increasing a system cooling capacity of the transport climate control system to lower the mean kinetic temperature in the climate controlled space, and when the difference is not greater than or equal to the first threshold value, decreasing the cooling capacity of the transport climate control system.

Aspect 15. The transport climate control system of any one of Aspects 12-14, wherein the controller is further configured to:

determine whether a temperature recovery triggering event has occurred or is in progress for the transport unit;

wherein when the temperature recovery triggering event has occurred, the controller further configured to:

predict the mean kinetic temperature and a temperature in the climate controlled space as a function of time, t, for recovery to the mean kinetic temperature setpoint;

determine a predictive value of the mean kinetic temperature in the climate controlled space at the end of the recovery, adjust a system cooling capacity of the transport climate control system to control the predicted mean kinetic temperature to the mean kinetic temperature setpoint, which can include:

wherein when the predictive value of the mean kinetic temperature is greater than the mean kinetic temperature setpoint at any of the time t, increase a target system cooling capacity of the transport climate control system, wherein when the predictive value of the mean kinetic temperature is not greater than the mean kinetic temperature setpoint, determining if a difference between the mean kinetic temperature setpoint and the predicted value of the mean kinetic temperature is less than a second threshold value, wherein when the difference between the mean kinetic temperature setpoint and the predicted value of the mean kinetic temperature is not less than the second threshold value, maintaining operational parameters of the transport climate control system to maintain the system cooling capacity, and when the difference between the mean kinetic temperature setpoint and the predicted value of the mean kinetic temperature is less than the second threshold value, decreasing the target system cooling capacity of the transport climate control system.

Aspect 16. The transport climate control system of any one of Aspects 12-15, wherein the controller is further configured to:

adjust a temperature range for a start/stop cycle mode to control the mean kinetic temperature to the mean kinetic temperature setpoint, which can include:

determine if the difference is less than a third threshold value or the compressor is running in a start/stop cycle, wherein when the difference is less than the third threshold value or the compressor is running in the start/stop cycle, running the compressor in a start/stop control mode for one cycle, and when the difference is not less than the third threshold value, running the compressor in a continuous control mode;

wherein, when the compressor is running in the start/stop control mode, and the difference is not greater than a fourth threshold value, decreasing a value of the third threshold value, and when the difference is greater than the fourth threshold value and is not less than or equal to a fifth threshold value, increasing the value of the third threshold value.

Aspect 17. The transport climate control system of any one of Aspects 12-16, wherein the controller is further configured to operate the compressor in a start/stop control mode and configured to:

receive a start temperature for starting the compressor and a stop temperature for stopping the compressor; and determine whether a cycle of the start/stop control mode has been completed, wherein if the cycle of the start/stop control mode has been completed, adjusting the start temperature and/or the stop temperature to control the mean kinetic temperature to the mean kinetic temperature setpoint, which can include:

determine whether the difference is less than a sixth threshold value, wherein when the difference is less than the sixth threshold value, increase the start threshold temperature for starting the compressor, and when the difference is not less than the sixth threshold value, determine if the mean-kinetic temperature in the climate controlled space is greater than or equal to a seventh threshold value, wherein when the mean-kinetic temperature in the climate controlled space is greater than or equal to the seventh threshold value, decreasing the start threshold temperature for starting the compressor, and when the mean-kinetic temperature in the climate controlled space is not greater than or equal to the seventh threshold value, maintaining the start threshold temperature.

Aspect 18. The transport climate control system of any one of Aspects 12-17, wherein the controller is further configured to operate the compressor in a continuous control mode and configured to:

set an upper bound and/or a lower bound of acceptable temperatures and control the transport climate control system to control the temperature within the set bounds to control the mean kinetic temperature to the mean kinetic temperature setpoint, which can include:

determine whether the difference between the mean kinetic temperature setpoint and the mean kinetic temperature is less than or equal to an eighth threshold value or if the temperature in the climate controlled space is less than a low temperature threshold, wherein when the difference is less than or equal to the eighth threshold value or when the temperature in the climate controlled space is less than a low temperature threshold, decreasing a system cooling capacity of the transport climate control system, wherein when the difference is not less than or equal to the eighth threshold value or when the temperature in the climate controlled space is not less than the low temperature threshold, determining whether the difference is greater than zero or whether the temperature in the climate controlled space is greater than the high temperature threshold, wherein when the difference is greater than zero or when the temperature in the climate controlled space is greater than the high temperature threshold, maintaining operational parameters of the transport climate control system to maintain the system cooling capacity, and when the difference is not greater than zero or when the temperature in the climate controlled space is not greater than the high temperature threshold, increasing the system cooling capacity of the transport climate control system.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of operating a transport climate control system used to provide climate control within a climate control space of a transport unit, the method comprising:

setting a mean kinetic temperature setpoint to control the transport climate control system;

determining, using a controller, a mean kinetic temperature in the climate controlled space;

determining, using the controller, a difference between the mean kinetic temperature setpoint and the mean kinetic temperature in the climate controlled space; and controlling the transport climate control system based on at least the difference between the mean kinetic temperature setpoint and the mean kinetic temperature in the climate controlled space to regulate the mean kinetic temperature in the climate controlled space, wherein the controlling the transport climate control system of the transport climate control system comprises:

determining whether a temperature recovery triggering event has occurred or is in progress for the transport unit;

when the temperature recovery triggering event has occurred, the method further comprising:

predicting the mean kinetic temperature and a temperature as a function of time, t, for recovery to the mean kinetic temperature setpoint in the climate controlled space along various times during the recovery, and during the recovery, adjusting a system cooling capacity of the transport climate control system to control the predicted mean kinetic temperature to the mean kinetic temperature setpoint.

2. The method of claim 1, wherein the controlling the transport climate control system comprises:

switching between a continuous running mode and a start/stop cycle mode to control the mean kinetic temperature to the mean kinetic temperature setpoint.

3. The method of claim 2, further comprising, when at any time the mean kinetic temperature in the climate controlled space is greater than the mean kinetic temperature setpoint, running the compressor in the continuous mode.

4. The method of claim 1, wherein the controlling the transport climate control system operates the compressor in a start/stop control mode and comprises:

setting a start temperature for starting the compressor and a stop temperature for stopping the compressor; and adjusting the start temperature and/or the stop temperature to control the mean kinetic temperature to the mean kinetic temperature setpoint.

5. The method of claim 1, wherein the controlling the transport climate control system comprises:

wherein an upper bound and/or a lower bound of acceptable temperatures is set, and wherein the transport climate control system controls the temperature within the set bounds to control the mean kinetic temperature to the mean kinetic temperature setpoint.

6. The method of claim 5, wherein the system cooling capacity is increased or decreased by controlling at least one of a compressor speed or condenser fan speed.

7. A transport climate control system for providing climate control within a climate controlled space of a transport unit, comprising:

a climate control circuit including a compressor;

a temperature sensor, configured to measure a temperature in the climate controlled space; and a controller, having a processor, configured to:

receive the temperature from the temperature sensor;

receive a mean kinetic temperature setpoint to control the transport climate control system;

determine a mean kinetic temperature in the climate controlled space based on the temperature from the temperature sensor;

determine a difference between the mean kinetic temperature setpoint and the mean kinetic temperate in the climate controlled space; and control the transport climate control system based on at least the difference between the mean kinetic temperature setpoint and the mean kinetic temperature in the climate controlled space to regulate the mean kinetic temperature in the climate controlled space, which includes adjusting a speed of recovery of a system cooling capacity of the transport climate control system based on whether the difference between the mean kinetic temperature setpoint and the mean kinetic temperature is above or below a threshold value, wherein when the difference is greater or equal to the threshold value, the speed of recovery is at a first system cooling capacity, and wherein when the difference is not greater or equal to the threshold value, the speed of recovery is at a second system cooling capacity, wherein the first system cooling capacity is greater than the second system cooling capacity, and wherein the controller is further configured to:

determine whether a temperature recovery triggering event has occurred or is in progress for the transport unit;

wherein when the temperature recovery triggering event has occurred, the controller is further configured to:

predict the mean kinetic temperature and the temperature in the climate controlled space as a function of time, t, for recovery to the mean kinetic temperature setpoint along various times during the recovery, adjust the system cooling capacity of the transport climate control system to control the predicted mean kinetic temperature to the mean kinetic temperature setpoint.

8. The transport climate control system of claim 7, wherein the temperature sensor is located on cargo in the climate controlled space or along an inner surface of the transport unit.

9. The transport climate control system of claim 7, wherein the controller is further configured to:

adjust a temperature range for a start/stop cycle mode to control the mean kinetic temperature to the mean kinetic temperature setpoint.

10. The transport climate control system of claim 7, wherein the controller is further configured to operate the compressor in a start/stop control mode and configured to:

receive a start temperature for starting the compressor and a stop temperature for stopping the compressor; and determine whether a cycle of the start/stop control mode has been completed, wherein when the cycle of the start/stop control mode has been completed, adjusting the start temperature and/or the stop temperature to control the mean kinetic temperature to the mean kinetic temperature setpoint.

11. The transport climate control system of claim 7, wherein the controller is further configured to operate the compressor in a continuous control mode and configured to:

set an upper bound and/or a lower bound of acceptable temperatures and control the transport climate control system to control the temperature within the set bounds to control the mean kinetic temperature to the mean kinetic temperature setpoint.

* * * * *